(12) United States Patent
Wasileski et al.

(10) Patent No.: US 7,222,417 B2
(45) Date of Patent: May 29, 2007

(54) VALVE TOOLING SYSTEM

(75) Inventors: Robert F. Wasileski, Allison Park, PA (US); Michael C. Moore, Hibbs, PA (US); Stuart C. Weddle, Independence, MO (US); Jesse Horton, Lake City, TN (US)

(73) Assignee: Siemens Power Generation, Inc., Orlando, FL (US)

( * ) Notice: Subject to any disclaimer, the term of this patent is extended or adjusted under 35 U.S.C. 154(b) by 239 days.

(21) Appl. No.: 10/854,883

(22) Filed: May 27, 2004

(65) Prior Publication Data

US 2005/0086788 A1    Apr. 28, 2005

Related U.S. Application Data

(60) Provisional application No. 60/513,711, filed on Oct. 23, 2003.

(51) Int. Cl.
*B23P 19/00*    (2006.01)
*B25B 27/14*    (2006.01)

(52) U.S. Cl. .......................................... 29/798; 29/281.5

(58) Field of Classification Search .................. 29/798, 29/464, 429, 281.5, 281.1, 559, 335, 249, 29/564, 564.1, 564.2, 566, 56.5, 56.6; 269/289 R, 269/71, 73, 60, 68

See application file for complete search history.

(56) References Cited

U.S. PATENT DOCUMENTS

| 4,667,388 A | 5/1987 | Browning |
| 6,412,158 B1 * | 7/2002 | Moore .......................... 29/249 |
| 6,415,487 B1 | 7/2002 | Leimer |
| 6,691,390 B2 * | 2/2004 | Arvin ........................ 29/281.5 |

* cited by examiner

*Primary Examiner*—John C. Hong

(57) ABSTRACT

A tooling system including a workstation assembly and a toolkit, is for performing an operation on a valve assembly. The workstation assembly includes a base platform; upright members extending generally vertically therefrom; an adjustable valve seat assembly coupled thereto for adjusting the height and alignment of the valve assembly being worked on; a stabilizing assembly for further aligning and securing the valve assembly; and a clamping assembly for engaging and securing the valve assembly once it is aligned, in order to permit the operation to be quickly and easily performed on the aligned, secured valve assembly. A method of use is also disclosed.

10 Claims, 16 Drawing Sheets

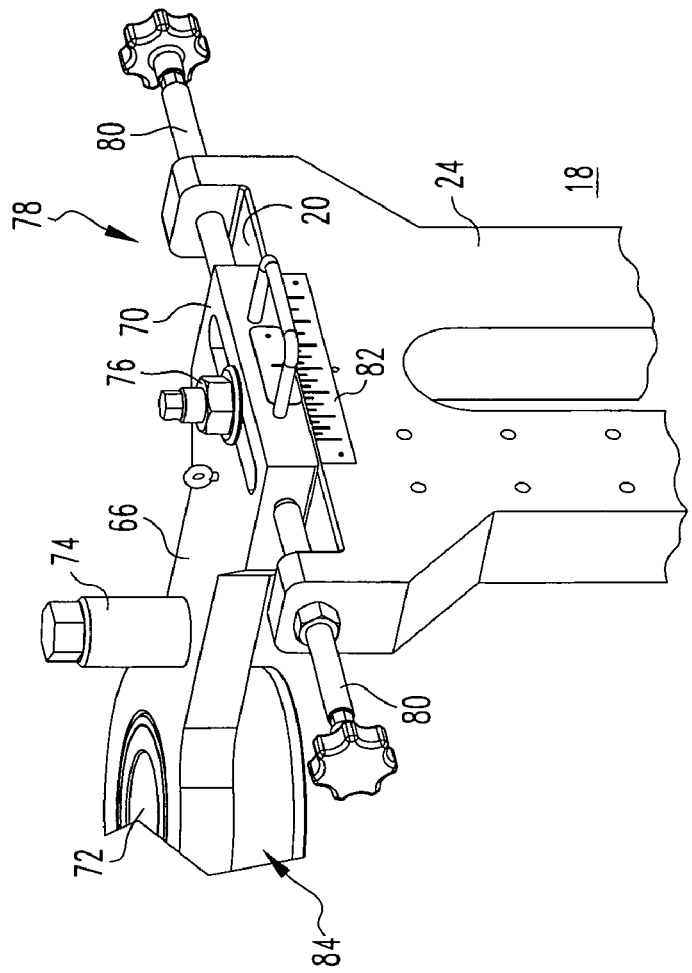
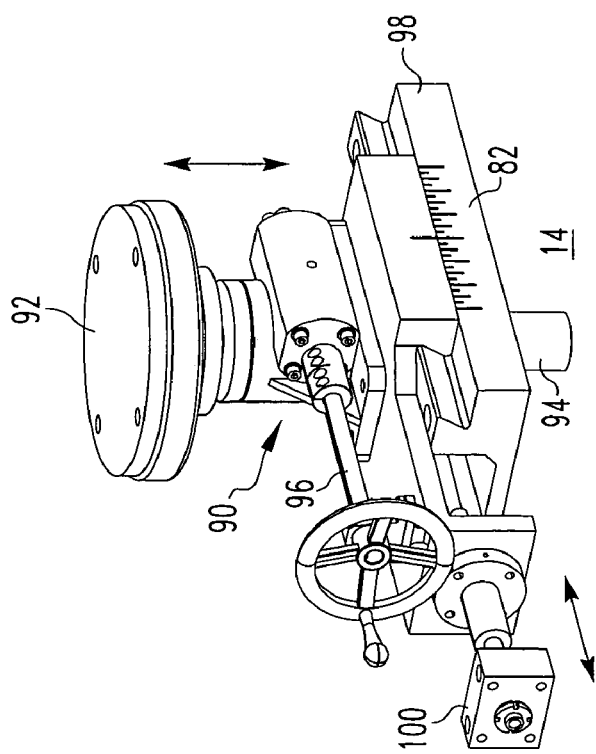
FIG.1B
FIG.1A

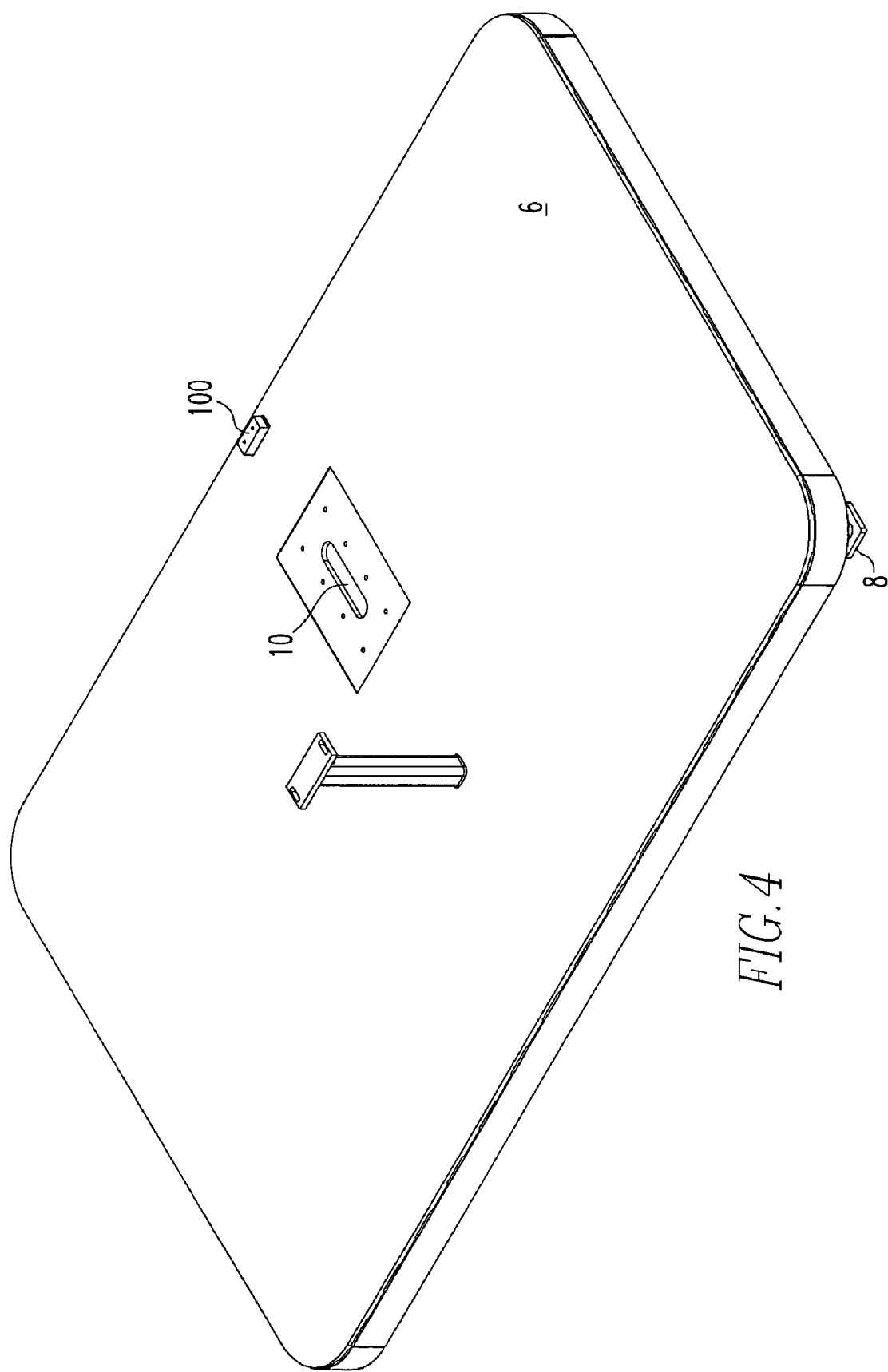

VALVE TOOLING SYSTEM

CROSS-REFERENCE TO RELATED APPLICATION

This application claims priority under 35 USC § 119(e) to Provisional Application Ser. No. 60/513,711, filed on Oct. 23, 2003, entitled "Steam Valve Maintenance Tool," which is incorporated herein by reference.

BACKGROUND OF THE INVENTION

1. Field of the Invention

The present invention relates generally to valve assemblies and, more particularly, to a tooling system for performing operations on valve assemblies. The invention also relates to a method of employing a valve tooling system.

2. Background Information

Valve assemblies (e.g., without limitation, fossil steam turbine inlet valves; non-nuclear throttle valves; governor valves; interceptor valves; pilot valves; reheat stop valves) used, for example, in power generation stations, are frequently subject to routine maintenance and inspection. This requires operations such as, for example, disassembly and reassembly to be performed on the valve assembly. New valves, which will be employed within the power generation system, require initial assembly of the valve assembly. Valve assemblies, particularly those used in power generation applications, can be large and awkward to handle, making such maintenance, assembly and disassembly, and inspection operations difficult and even dangerous.

Conventionally, large valve assemblies have been assembled, disassembled and maintained using a variety of arbitrary manual techniques. One such technique involves the use of various instruments commonly referred to as kluges, which have been developed in an attempt to facilitate, for example, manual valve disassembly operations. Such kluges are often limited to use with a particular type of valve and frequently require several workers to try and hold the valve assembly and kluge stable while performing the operation on the valve (i.e., while applying torque to the valve nut in order to loosen it for assembly.) However, the valve assembly remains relatively insecure and may move, slip or fall causing damage to the valve or injury to a worker. Additionally, the unstable nature of the valve assembly and the arbitrary application of various kluges and manual techniques makes it extremely difficult to accurately and predictably apply a calibrated force to the valve. This may lead to further valve damage. Such manual, random operations are also time consuming, extending the time required to perform the operation on the valve and thus, for example, adding to the duration of the power station downtime.

In any valve assembly, it is highly desirable to apply forces (i.e., without limitation, torque; compression; static load; dynamic load) accurately, in order to avoid damage to the valve.

There is a need, therefore, for an apparatus and method which will permit operations to quickly be performed on a wide variety of valve assemblies in an accurate, predictable and safe manner.

Accordingly, there is room for improvement in valve tooling and in methods of employing tools to perform operations on valve assemblies.

SUMMARY OF THE INVENTION

These needs and others are satisfied by the present invention, which is directed to a tooling system for quickly aligning and securing a valve assembly in a desired position and accurately, predictably and safely performing an operation on the aligned, secure valve assembly. A method of use is also discussed.

As one aspect of the invention, a tooling system for a valve assembly, comprises: a workstation assembly structured to align and secure the valve assembly in order to perform an operation thereon; and a toolkit including a plurality of tools for performing the operation on the valve assembly, which is aligned and secured in the workstation assembly.

The workstation assembly may further comprise: a generally horizontal base platform; a plurality of upright members coupled to and extending generally vertically from the base platform; an adjustable valve seat assembly coupled to the base platform and structured to adjust the height and alignment of the valve assembly being worked on; a stabilizing assembly structured to further align and secure the valve assembly; and a clamping assembly structured to engage and secure the valve assembly once it is aligned, in order to permit the operation to be quickly and easily performed on the aligned, secured valve assembly.

The clamping assembly may include a generally horizontal clamping frame forming an opening for receiving the valve assembly therethrough, a movable clamping bar, a generally stationary clamping bar and a pressure applicator for moving the movable clamping bar towards the generally stationary clamping bar, the movable clamping bar coupled to a guide rail on the clamping frame, the generally stationary clamping bar disposed at an end of the clamping frame opposite the moving clamping bar, and the pressure applicator coupled between the movable clamping bar and the opposite end of the clamping frame. The pressure applicator may be structured to apply pressure to the movable clamping bar thereby moving it against the valve body, in order to securely clamp a portion of the valve assembly therebetween. At least one of the movable and generally stationary clamping bars may include a universal jaw adapter for receiving an interchangeable, valve-specific jaw interlock.

The stabilizer bar may include: an aperture extending therethrough for receiving a valve stem of the valve assembly; a fastener for each end of the stabilizer bar, the fastener structured to secure each end of the stabilizer bar to the top of a corresponding one of the upright positioning bars, respectively, when tightened; and a centering mechanism for aligning the stabilizer bar and the valve assembly therein with respect to the upright positioning bars. The stabilizer bar may further include a Belleville washer assembly surrounding the aperture through the stabilizer bar and structured to provide a downward force on a wrench assembly engaging the valve assembly, in order to compressively secure the wrench assembly for performing an operation on the valve assembly.

The adjustable valve seat assembly may include: an adjustable pedestal structured to support the valve assembly while permitting vertical adjustment thereof; and an adjustable jacking support assembly coupled to the slot in the base platform, in order to provide transverse adjustment of the adjustable pedestal, which is coupled thereto, thereby providing further alignment of the valve assembly within the opening in the clamping frame and with respect to the stabilizing assembly.

The plurality of tools in the toolkit may be selected from the group consisting of, but not limited to, wrench assemblies, wrenches, T-bar wrenches, come-alongs, come-along brackets, eyebolts, chains, keys, pins, pin sockets and key sockets. The plurality of tools may be employed to facilitate the loosening of the valve nut of the valve assembly, in order to permit disassembly of the valve assembly while resisting damage thereto.

As another aspect of the invention, a method of performing an operation on a valve assembly comprises the steps of: providing a valve assembly; providing a tooling system including a workstation assembly for aligning and securing the valve assembly therein, in order to perform the operation thereon; inserting the valve assembly into the workstation assembly; aligning the valve assembly and securing the valve assembly once aligned within the workstation assembly; providing a plurality of tools for performing the operation on the valve assembly; and performing the operation on the valve assembly, which is aligned and secured within the workstation assembly.

The step of providing a tooling system including a workstation assembly, may further comprise: providing a generally horizontal base platform; providing an adjustable valve seat assembly adjustably coupled to the base platform for providing lateral alignment of the valve assembly, the adjustable valve seat assembly including an adjustable pedestal for supporting and providing vertical adjustment of the valve assembly; providing a stabilizing assembly for aligning and securing an upper portion of the valve assembly; and providing a clamping assembly for engaging and securing the valve assembly after it is aligned within the workstation assembly.

The step of inserting the valve assembly into the workstation assembly may include the steps of: removing the stabilizer bar; inserting the valve assembly between the clamping bars of the clamping assembly until the valve assembly rests upon the adjustable pedestal of the adjustable valve seat assembly; and replacing the stabilizer bar over the upper portion of the valve assembly.

The step of aligning and securing the valve assembly within the workstation assembly may include the steps of: adjusting the lateral position of the adjustable valve seat assembly and the adjustable pedestal coupled thereto, in order to align the valve assembly within the workstation assembly; adjusting the height of the adjustable pedestal, in order to position the valve assembly supported thereby at a desired vertical position within the workstation assembly; engaging the body of the valve assembly with the clamping bars of the clamping assembly; engaging the valve nut with at least one of the plurality of tools; sliding the stabilizer bar over the upper portion of the valve assembly; aligning and securing the upper portion of the valve assembly within the stabilizing assembly; and tightening the clamping assembly, in order to secure the valve assembly once it is aligned within the workstation assembly.

The step of providing a clamping assembly may include providing a universal jaw adapter for receiving an interchangeable, valve-specific jaw interlock for at least one of the movable and generally stationary clamping bars. Each jaw interlock may include a valve-engaging face for securing the valve body of the valve assembly while resisting damage thereto.

The step of performing the operation on the valve assembly may include the step of loosening the valve nut. The step of loosening the valve nut of the valve assembly may include the steps of: providing as the plurality of tools at least a wrench assembly; sliding the wrench assembly over the valve stem of the valve assembly until it fully engages the valve nut; sliding the stabilizer bar over the wrench assembly, in order that the valve stem is disposed within the aperture of the stabilizer bar and the ends of the stabilizer bar are coupled to the upright positioning bars, respectively; providing a fastener for securing each end of the stabilizer bar to the corresponding one of the upright positioning bars; providing a pair of jacking screws on each of the upright positioning bars for aligning the ends of the stabilizer bar; tightening the jacking screws to center the stabilizer bar and the upper portion of the valve assembly therein, respectively, within the workstation assembly; and tightening the fastener at each end of the stabilizer bar, thereby locking the stabilizer bar and securing the valve assembly in rigid vertical alignment.

The step of loosening the valve nut may further include: clamping the valve body within the movable and generally stationary clamping bars, respectively; tightening the stem centering nut onto the valve stem, in order to hold the wrench assembly and the valve assembly together; engaging the wrench assembly with the wrench; and employing the wrench to apply torque to the valve nut, in order to loosen it. Additional torque may be applied to the valve nut using, for example, the aforementioned T-bar wrench and come-alongs.

BRIEF DESCRIPTION OF THE DRAWINGS

A full understanding of the invention can be gained from the following description of the preferred embodiments when read in conjunction with the accompanying drawings in which:

FIG. 1A is an isometric, enlarged detail view of the adjustable valve seat assembly within circle 1A of the tooling system and workstation of FIG. 1.

FIG. 1B is an isometric, enlarged detail view of a portion of the stabilizer assembly within circle 1B of the tooling system and workstation of FIG. 1.

FIG. 4 is an isometric view of the base platform of the workstation assembly of FIGS. 1 and 3.

DESCRIPTION OF THE PREFERRED EMBODIMENT

Figure 1:
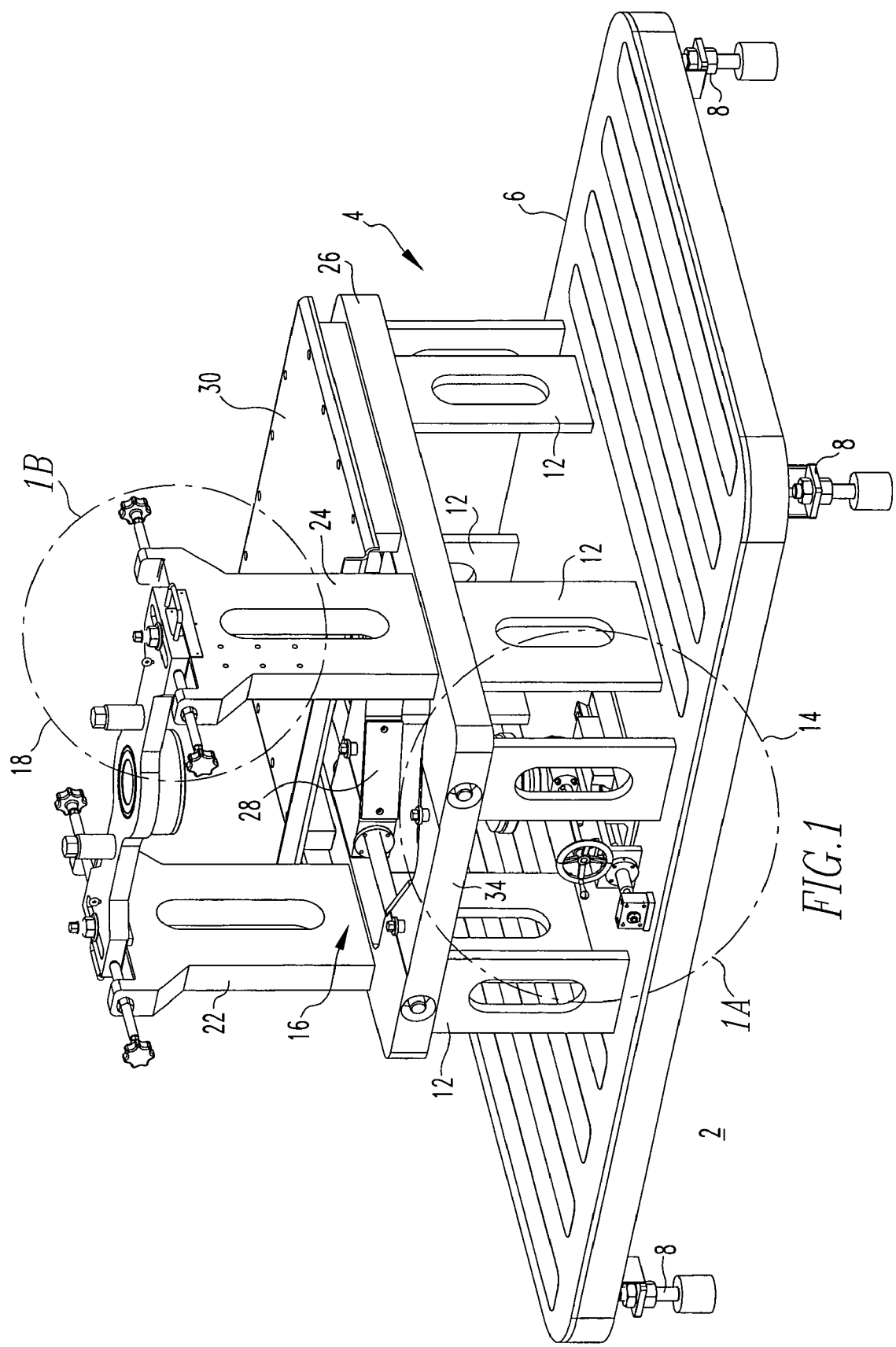
FIG. 1 is an isometric view of the front side of a valve assembly tooling system and workstation for performing an operation on the valve assembly in accordance with an embodiment of the present invention.

The invention will be described as applied to disassembly of fossil steam turbine inlet valves, including throttle valves, pilot valves, governor valves and interceptor valves, although it will become apparent that it could also be applied to the disassembly of other types of valve assemblies, both within and outside the field of power generation and to valve operations in addition to disassembly, including, without limitation, initial assembly, maintenance, including inspection and repair, and re-assembly.

For purposes of the description hereinafter, the terms "upper", "lower", "upright", "lateral", "transverse", "vertical", "horizontal", "top", "bottom", "left", "right", and derivatives thereof shall relate to the invention, as it is oriented in the drawing figures. However, it is to be understood that the invention may assume various alternatives and step sequences, except where expressly specified to the contrary. It is also to be understood that the specific elements and processes illustrated in the drawings and described in the following specification, are simply exemplary embodiments of the invention. Therefore, specific dimensions, orientations and other physical characteristics related to the embodiments disclosed herein are not to be considered limiting.

As employed herein, the term "toolkit" refers to any tool or combination of tools that may be used to facilitate performing an operation on the valve assembly. The exemplary operation includes loosening the valve nut of a valve assembly for disassembly thereof. Tools which may be used to perform the exemplary operation include, without limitation, wrench assemblies, wrenches, T-bars, come-alongs, come-along brackets, eyebolts, keys, key sockets, pin sockets, pins, spacers, jacks, chains, heat mechanisms, drills, drilling jigs and hammers.

As employed herein, the term "fastener" refers to any suitable fastening, connecting or tightening mechanism expressly including, but not limited to, screws, bolts, the combination of bolts and nuts, and derivatives thereof.

FIG. 1 illustrates a valve tooling system 2 including a workstation assembly 4 which is structured to align and secure a variety of valve assembly 200 types, (e.g., without limitation, governor valves (FIG. 7); interceptor valves (not shown); pilot valves (not shown); throttle valves (FIG. 10)); in order to quickly, accurately, predictably and safely perform an operation thereon. The method of the present invention is accurate and predictable because of the ability of the workstation assembly 4 to securely hold the valve assembly 200 (FIGS. 7–10), in a desired position, thereby allowing force (i.e., torque applied to the valve nut 206 (FIG. 7)) to be applied from a single position, consistently. In this manner, through engineering testing and repetition, acceptable force values can be developed and recorded for each type of valve assembly 200 (FIGS. 7–10) to be worked on, for example, in a field procedure manual (not shown). This information can then be referenced in order to accurately and predictably subsequently perform similar valve operations efficiently. The present invention is safe because the valve assembly 200 (FIG. 7–10) is secure, thereby preventing it from falling and injuring a worker or becoming damaged, for example. It is fast and efficient because of the secure nature of the valve assembly 200 (FIGS. 7–10), which permits a consistent method of using tools 302 (FIGS. 6A–6F and FIG. 9) to apply force to the valve in a more predictable, accurate and thus concentrated manner in comparison with the prior art. By way of such efficiency, the present invention permits valve operations to be performed faster. Moreover, the present invention allows the duration of such valve operations and thus the power station downtime to be relatively accurately estimated, when compared with the prior art.

The tooling system 2 and workstation assembly 4 provide a mechanism for securing valve assemblies 200 in a desired position (i.e., substantially vertical), in order to perform an operation (i.e., initial assembly; disassembly; reassembly; repair; inspection) on the valve. The tooling system 2 is accompanied by a toolkit 300 (see, for example, the tools of FIGS. 6A–6F) that may be custom outfitted with the appropriate tools 302 (FIGS. 6A–6F) and hardware required to work on the designated valve or valves. As previously mentioned, and as will be discussed in further detail herein, the hardware includes such tools 302 (see, for example, FIG. 9) as, for example, wrench assemblies 304 (FIG. 6C and FIGS. 7–9), pin and key sockets 317, 318 (FIGS. 6D and 6E), spare keys (not shown) and pins 320 (FIG. 6F), a T-bar wrench 328 (FIG. 6A), spacers 326 (FIG. 9), stem centering nuts 322 (FIG. 9), pin-removal punches (not shown), come-alongs 342 (FIG. 10), come-along brackets 348 (FIGS. 6B, 7 and 9), chains 352 (FIG. 9) and eyebolts 350 (FIGS. 7 and 9), and safety hoist rings (not shown).

As shown in FIG. 1, the exemplary workstation assembly 4 includes a generally horizontal base platform 6, a plurality of upright members 12 coupled to and extending generally vertically from the base platform 6, including two upright positioning bars 22, 24, an adjustable valve seat assembly 14 for positioning valves, a clamping assembly 16 for securing the valve once positioned, a stabilizing assembly 18 for securing the valve, and a deck plate 30 for tool and item support. The clamping assembly 16 includes a clamping frame 26 on top of the plurality of upright members 12 (best shown in FIG. 5). The clamping frame 26 includes an opening 28 for receiving the valve assembly 200 (FIGS. 7–10) therethrough. As shown, the deck plate 30 covers a portion of the clamping frame 26. The base platform 6 provides a convenient working surface for staging tools 302 (not shown in FIG. 1) and parts. As shown, the exemplary base platform 6.

Figure 3:
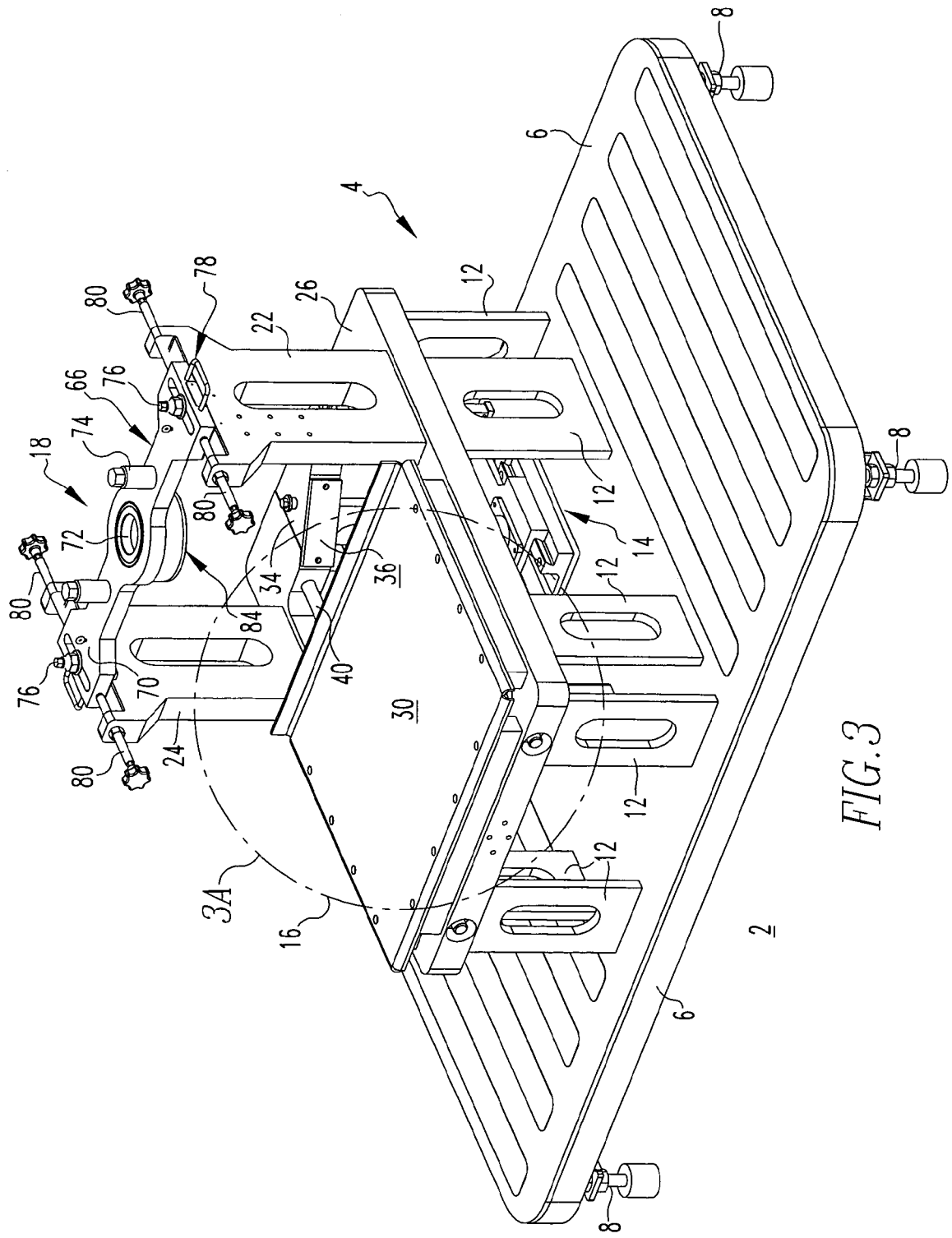
FIG. 3 is an isometric view of the back side of the valve assembly tooling system and workstation of FIG. 1.

FIG. 1A is a detailed view of the adjustable valve seat assembly 14. As shown, the exemplary adjustable valve seat assembly 14 includes an adjustable pedestal 92 structured to support the valve assembly 200 (FIGS. 7–10), while permitting vertical adjustment thereof. The adjustable pedestal 92 is coupled to an adjustable jacking support assembly 90. The exemplary adjustable jacking support assembly 90 is coupled to a slot 10 (FIG. 4) in the base platform 6 (FIG. 4). The adjustable jacking support assembly 90 provides transverse adjustment of the adjustable pedestal 92 which is coupled thereto, thereby providing alignment of the valve assembly 200 (FIG. 7–10) within the opening 28 in the clamping frame 26 (best shown in FIGS. 3A and 5). As shown in FIG. 1B, at least one jacking screw 80 provides the adjustment of the adjustable pedestal 92. The adjustable jacking support assembly 90 further includes a base 98 which is fixed to the base platform 6 (FIG. 4), in order that the shaft 94 of the adjustable pedestal 92 engages the slot 10 (FIG. 4) therein. A spacer block 100 provides a stationary reference mounted on the base platform 6 (FIG. 4) with respect to which the adjustable jacking support assembly 90 may be transversely adjusted. A graduated scale 82 is included on the base 98 of the exemplary adjustable jacking support assembly 90 in order to facilitate centering or alignment of the assembly 90 and the valve assembly 200 (FIGS. 7–10) supported thereby. Accordingly, the adjustable valve seat assembly 14 provides a convenient apparatus and method of horizontally and vertically positioning the valve in the desired location within the workstation assembly 4 (FIGS. 1 and 3).

Figure 5:
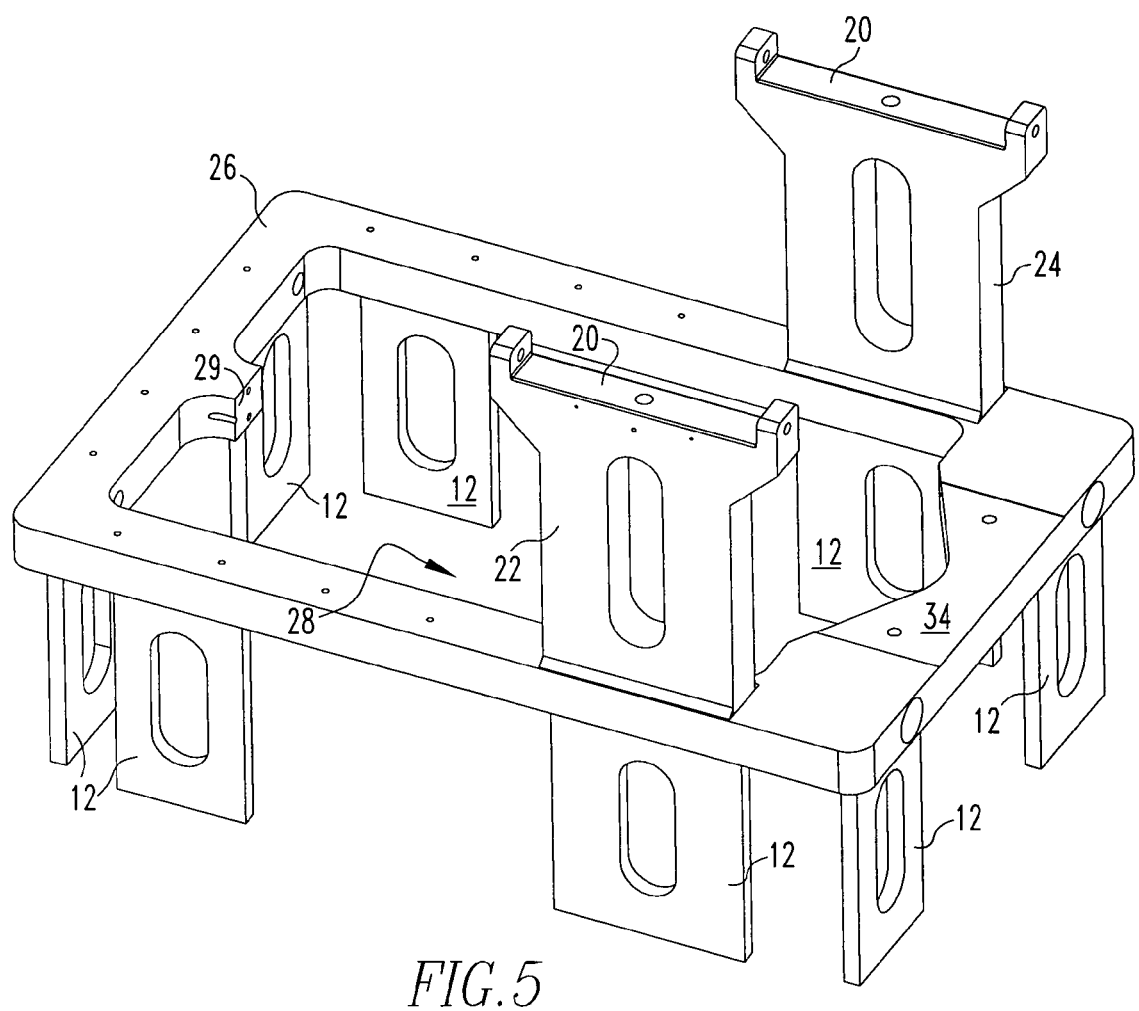
FIG. 5 is an isometric view of the clamping frame and positioning bars of the valve assembly tooling system and workstation assembly of FIGS. 1 and 3.

Referring now to FIG. 1B, a detailed view of the stabilizing assembly 18, which aides with the vertical alignment of the valve assembly 200, is shown. The stabilizing assembly 18 generally includes a stabilizer bar 66 having an aperture 72 extending through the center thereof for receiving the stem 204 of the valve assembly 200 and the end of the wrench assembly 304 (best shown in FIG. 9). The stabilizing bar 66 has two ends 68, 70 which are mounted, respectively, within recesses 20 in spaced apart upright positioning bars 22, 24 (one positioning bar 24 is shown in FIG. 1B). As best shown in FIG. 5, the positioning bars 22, 24 extend generally vertically from the top of the clamping frame 26. The ends 68, 70 of the stabilizer bar 66 are aligned within the corresponding recesses 20 using a centering mechanism 78. The exemplary centering mechanism 78 includes a pair of adjustable jacking screws 80 mounted through the sides of the position bar 24 and adjustable in order to engage the end 70 of the stabilizer bar 66, in order to align it in a desired position within the recess 20. A graduated scale 82 on the exemplary positioning bar 24 facilitates such alignment. Once aligned, the ends 68, 70 of the stabilizer bar 66 are locked in place using a fastener 76. As shown, the exemplary fasteners 76 include a threaded stud projecting from the recesses 20 in the positioning bars 22, 24 and a flange nut for threaded engagement therewith.

Figure 8:
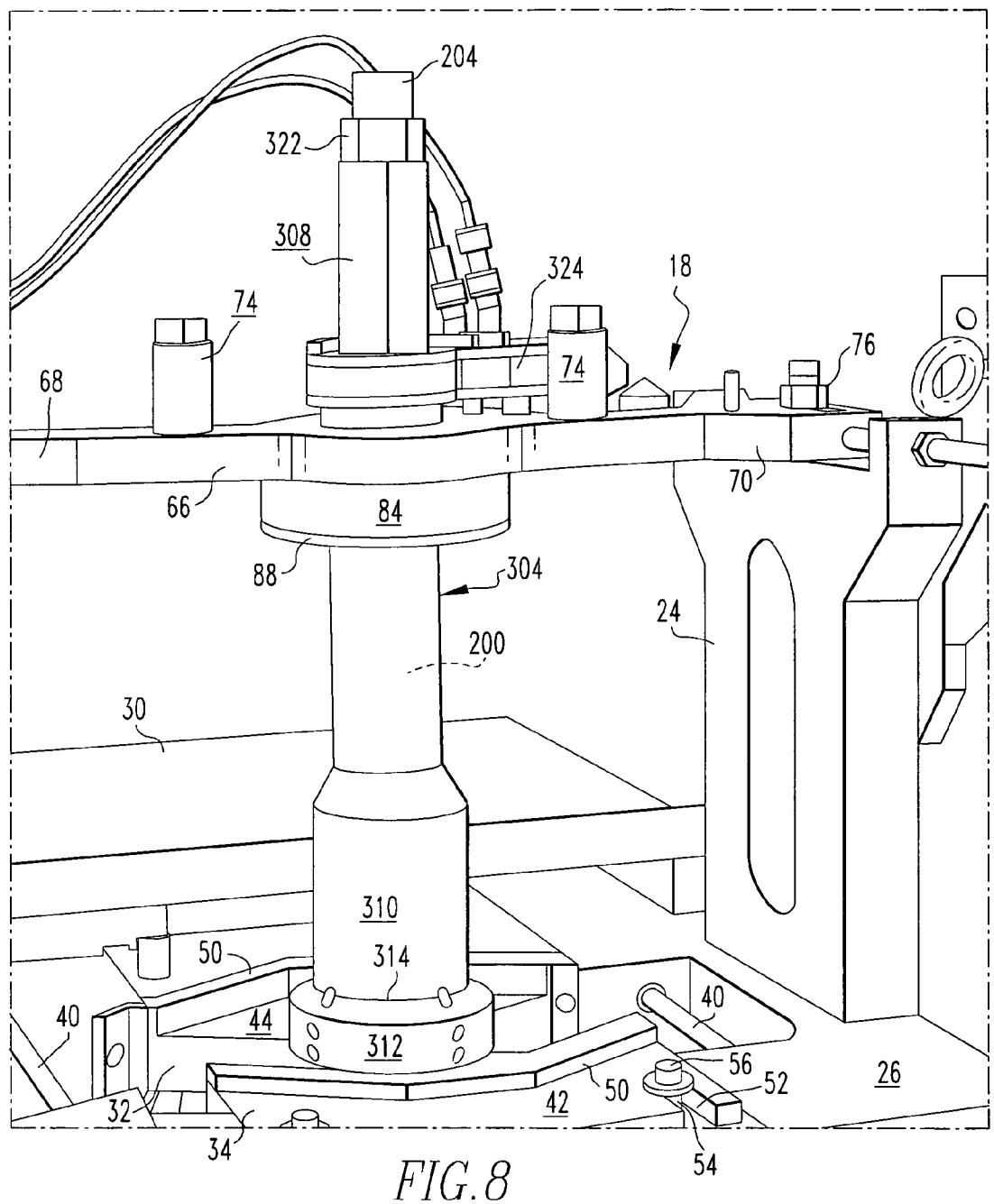
FIG. 8 is an isometric view of the valve assembly tooling system and governor valve of FIG. 7 with the wrench assembly positioned over the valve stem, the stabilizer bar fastened in place, and a hydraulic wrench engaging the end of the wrench assembly.

The exemplary stabilizer bar 66 further includes a reaction post 74 on each side of the aperture 72. The reaction posts 74 provide a holding position for tools 302 (FIG. 9), such as a hydraulic wrench 324 (best shown in FIG. 8), for example, when applying torque to the valve assembly 200 (FIG. 8). Accordingly, the exemplary stabilizing bar 66, which is held in place by four horizontally adjustable jacking screws 80 and two flange nuts 76 (best shown in FIG. 3), maintains rigid vertical alignment of the valve. The exemplary stabilizer bar 66 further includes a Belleville washer assembly 84 surrounding the aperture 72.

Figure 2:
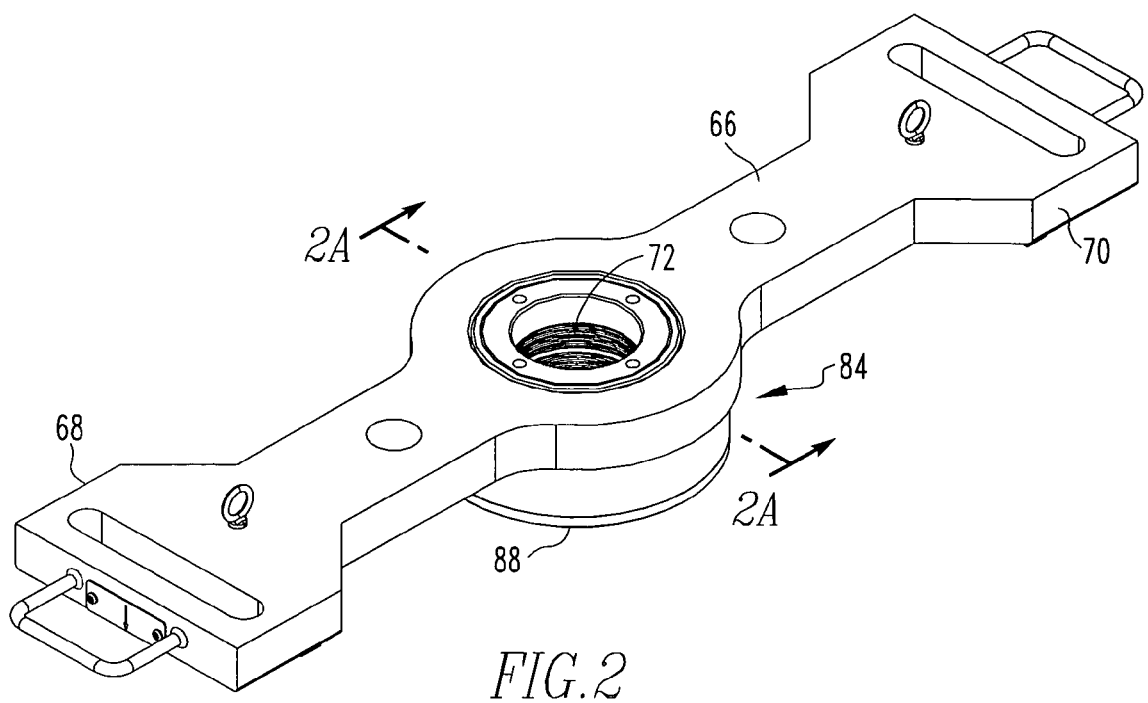
FIG. 2 is an isometric view of a stabilizer bar for the stabilizing assembly of FIG. 1B in accordance with an embodiment of the present invention.
Figure 2A:
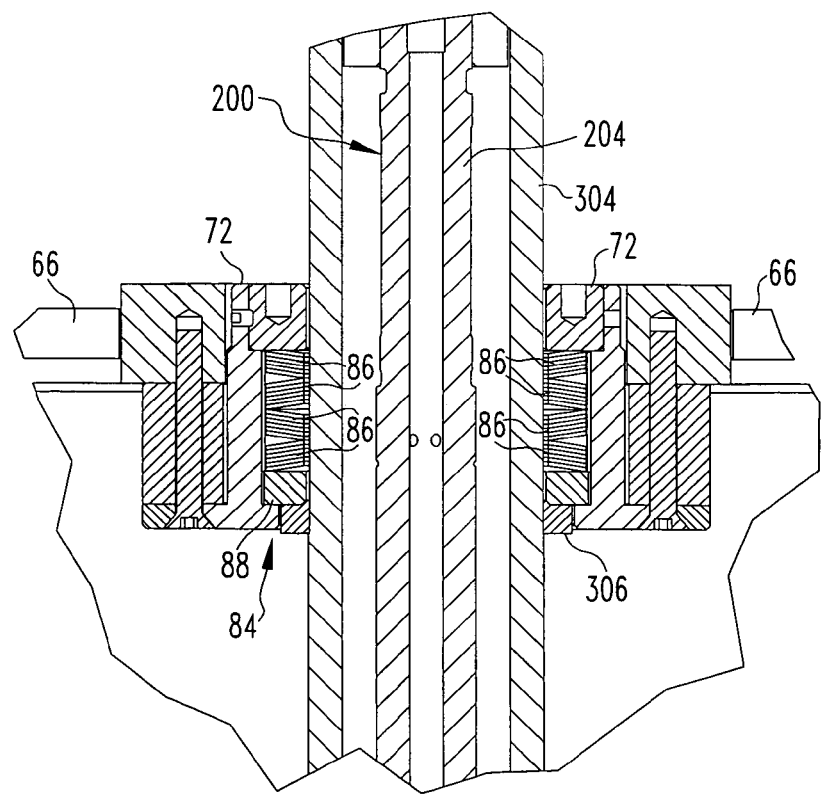
FIG. 2A is a cross-sectional view taken along line 2A—2A of the stabilizer bar of FIG. 2 and the cross section of a wrench assembly engaging a valve assembly, in order to show a Belleville washer assembly structured to provide a compressive download on the wrench assembly, in accordance with an embodiment of the invention.

FIGS. 2 and 2A further illustrate the exemplary stabilizer bar 66 and Belleville washer assembly 84 therefor. The Belleville washer assembly 84 is structured to provide a hold down force on the wrench assembly 304. As will be discussed hereinbelow, the wrench assembly 304 may have a tendency to lift up as hydraulic torque is applied to the hexagonal end of the extension wrench (best shown in FIG. 6C). Accordingly, a downward force is required to hold the wrench assembly 304 down. The downward force is created by compressing the exemplary Belleville washer assembly 84 against a thrust collar 306 on the extension wrench 308. As shown in FIG. 2A, the exemplary Belleville washer assembly 84 includes a plurality of Belleville washers 86, which are compressible, and a compression stop ring 88, which surrounds the aperture 72 in the stabilizer bar 66. The Belleville washers 86 may compress as the fasteners 76 attaching the ends 68, 70 of the stabilizer bar 66 (see, for example, fastener 76 securing end 70 of stabilizer bar 66 in FIG. 1B) are tightened. The compression in the Belleville washers 86 provides a downward force wherein the compression stop ring 88 engages and pushes downwardly on the thrust collar 306 of the wrench assembly 304 when the fasteners 76 are tightened. Accordingly, the stabilizer bar 66 and Belleville washer assembly 84 of the exemplary stabilizing assembly 18 maintain rigid vertical alignment of the valve, as well as hold down the wrench assembly 304.

Figure 3A:
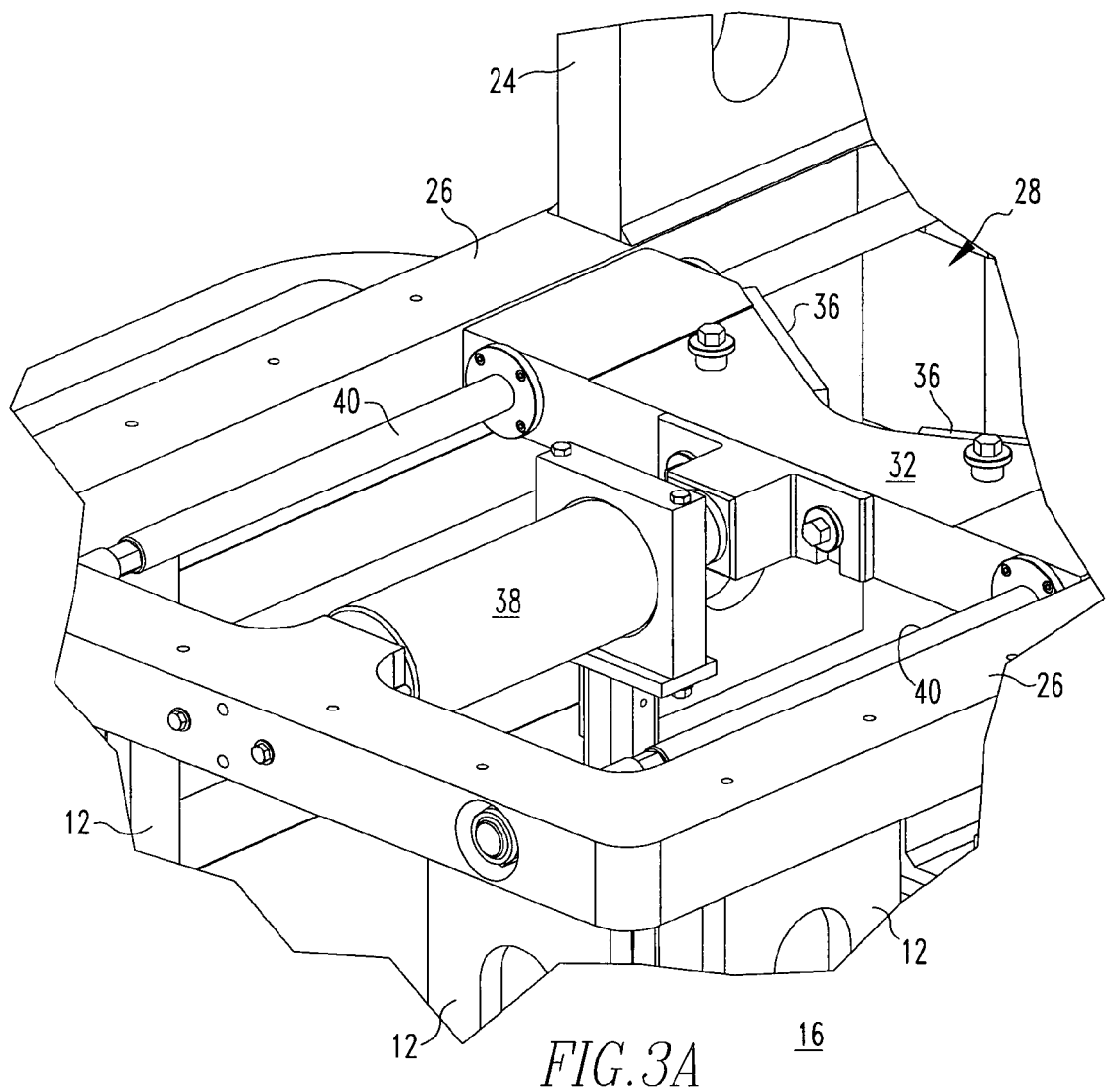
FIG. 3A is an isometric, enlarged detail view of the clamping assembly within circle 3A of the tooling system and workstation of FIG. 3, with the deck plate and mounting hardware removed to show hidden structures.

FIG. 3 illustrates the backside of the tooling system 2 and workstation assembly 4 shown in FIG. 1 and FIG. 3A shows a detailed view of the clamping assembly 16 therefore. In FIG. 3A, the deck plate 30 is removed for ease of illustration. As previously discussed, the clamping assembly 16 includes the generally horizontal clamping frame 26 attached to the tops of the plurality of upright members 12 and forms the opening 28 for receiving the valve assembly 200 (FIG. 7–10) therethrough. The pair of upright positioning bars 22, 24 (one positioning bar 24 is shown in FIG. 3A), discussed above in connection with the stabilizing assembly 18 (FIG. 1B), extend generally vertically above the generally horizontal clamping frame 26. The exemplary clamping assembly 16 includes a moveable clamping bar 32, a generally stationary clamping bar 34 (FIG. 3) and a pressure applicator 38 for moving the movable clamping bar 32 towards the stationary clamping bar 34. The movable clamping bar 32 is coupled to and slides axially along two guide rails 40 on the longitudinal sides of the clamping frame 26. The pressure applicator 38 moves the moveable clamping bar 32 towards the stationary clamping bar 34, in order to engage and secure the body 202 of the valve assembly 200 therebetween (see, for example, FIG. 7).

Continuing to refer to FIG. 3A, the generally stationary clamping bar 34 is disposed at an end of the clamping frame 26 opposite the end to which the pressure applicator 38 is coupled. The exemplary pressure applicator is a 30-ton hydraulic jack. However, it will be appreciated that any known or suitable alternative clamping mechanism (not shown), could be employed. Pressure is applied to the exemplary 30-ton hydraulic jack 38 by pumping the jack operating handle 39 (see operating handle 39 in FIG. 7). However, it will be appreciated that any known or suitable alternative method of actuating (e.g., computer control) the pressure applicator 38 could be employed.

Figure 3B:
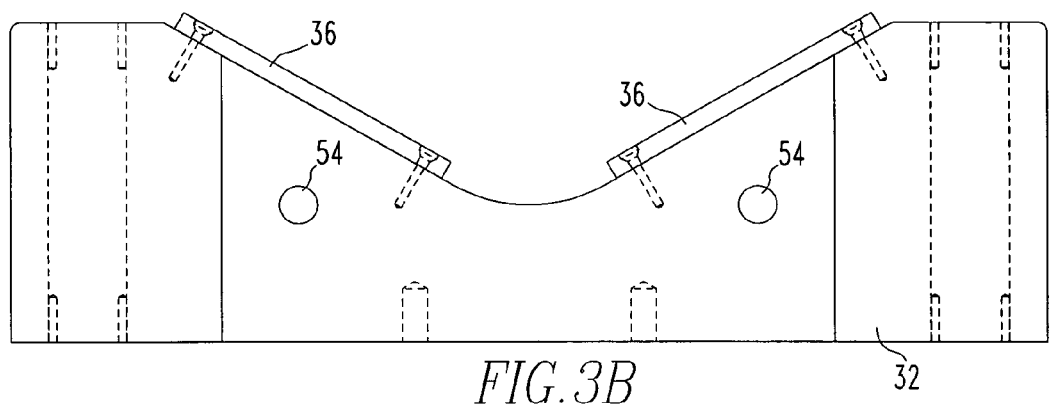
FIG. 3B is a plan view of a clamping bar for use with the clamping assembly of FIG. 3A.
Figure 10:
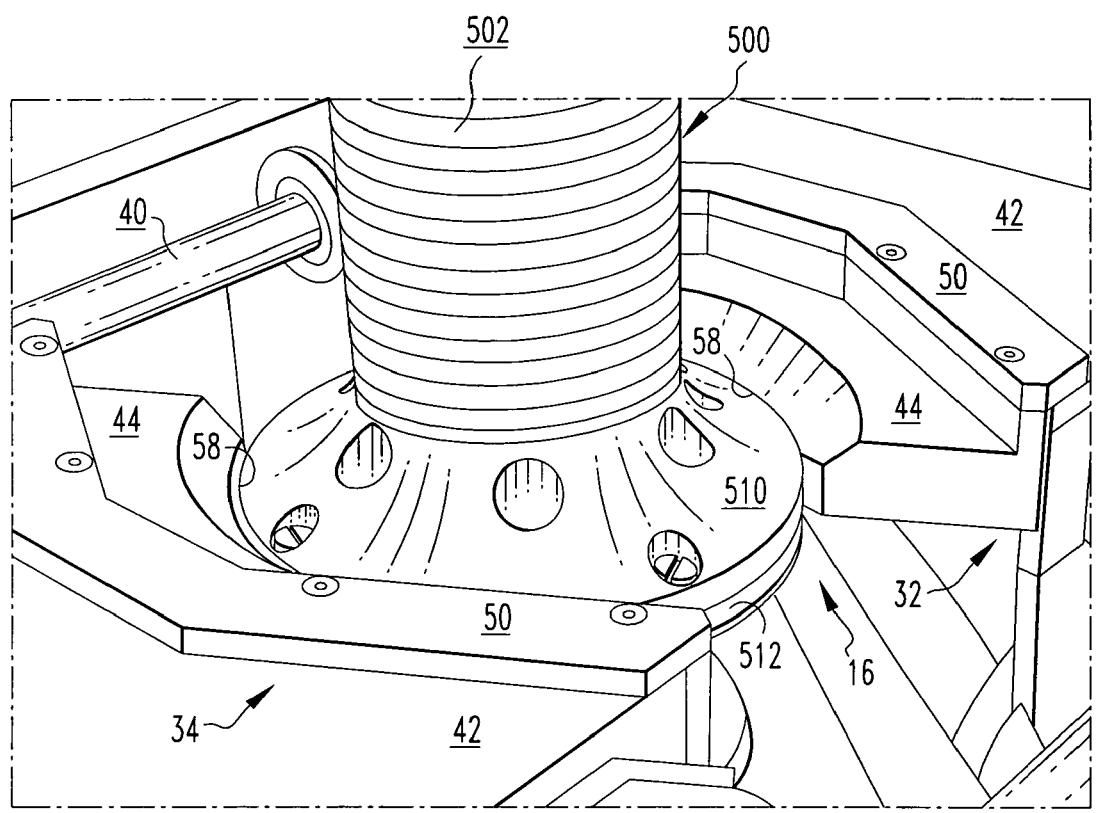
FIG. 10 is an isometric view of the clamping assembly of the valve assembly tooling system and workstation assembly engaging a throttle valve just above the crush ring, in accordance with another embodiment of the invention.

Referring now to FIG. 3B, the exemplary moveable and generally stationary clamping bars 32, 34 only movable clamping bar 32 is shown in FIG. 3B) further include clamping plates 36 for gripping the valve assembly 200. The exemplary clamping plates are brass clamping plates 36 structured to grip and secure the valve body 202 (FIG. 7) or valve plug 210 (FIG. 7) while resisting damage thereto. The exemplary movable clamping bar 32 and generally stationary clamping bar (not shown in FIG. 3B) are designed to accommodate universal jaw adapters 42, shown in FIG. 3C. The universal jaw adapters 42 are designed to receive interchangeable, valve-specific jaw interlocks 44 (see also FIG. 10 illustrating the jaw interlocks 44 engaging the valve plug 510 of the throttle valve assembly 500). The clamping bars 32, 34 include holes 54 for receiving a fastener 56 (best shown in FIG. 7), which is inserted through a slot 52 in the universal jaw adapter 42 and tightened to provide a clearance fit for the universal jaw adapter 42 which rests on the clamping bar 32. The interchangeable jaw interlock 44 is then attached to the universal jaw adapter 42.

Figure 3C:
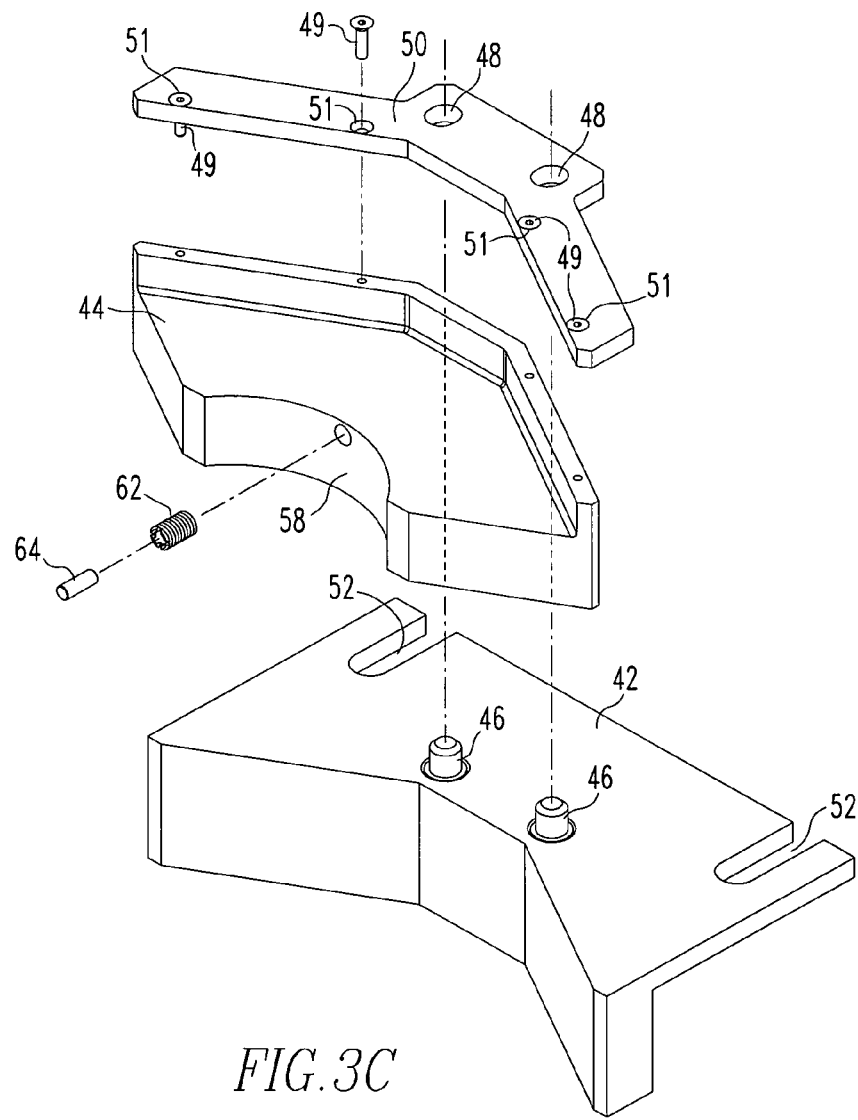
FIG. 3C is an exploded isometric view of a universal jaw adapter, jaw interlock and interlock support for use with the clamping bar of FIG. 3B in accordance with an embodiment of the invention.

As shown in FIG. 3C, the exemplary jaw assembly 42, 44 further includes an interlock support 50. The exemplary interlock support 50 includes a plurality of holes 51 (four holes 51 are shown in the interlock support 50 in FIG. 3C) for receiving a corresponding number of fasteners 49, which are tightened to secure the interlock support 50 to the interchangeable jaw interlock 44. The interchangeable jaw interlock 44 includes a gripping face or valve-engaging face 58. The exemplary interlock support 50 further includes a pair of through holes 48, which are received over a pair of locating pins 46 disposed on the top of the exemplary universal jaw adapter 42, as shown. Accordingly, in the exemplary jaw assembly 42, 44, the interchangeable jaw interlock 44 is conveniently designed to hang from the interlock support 50.

Figure 3D:
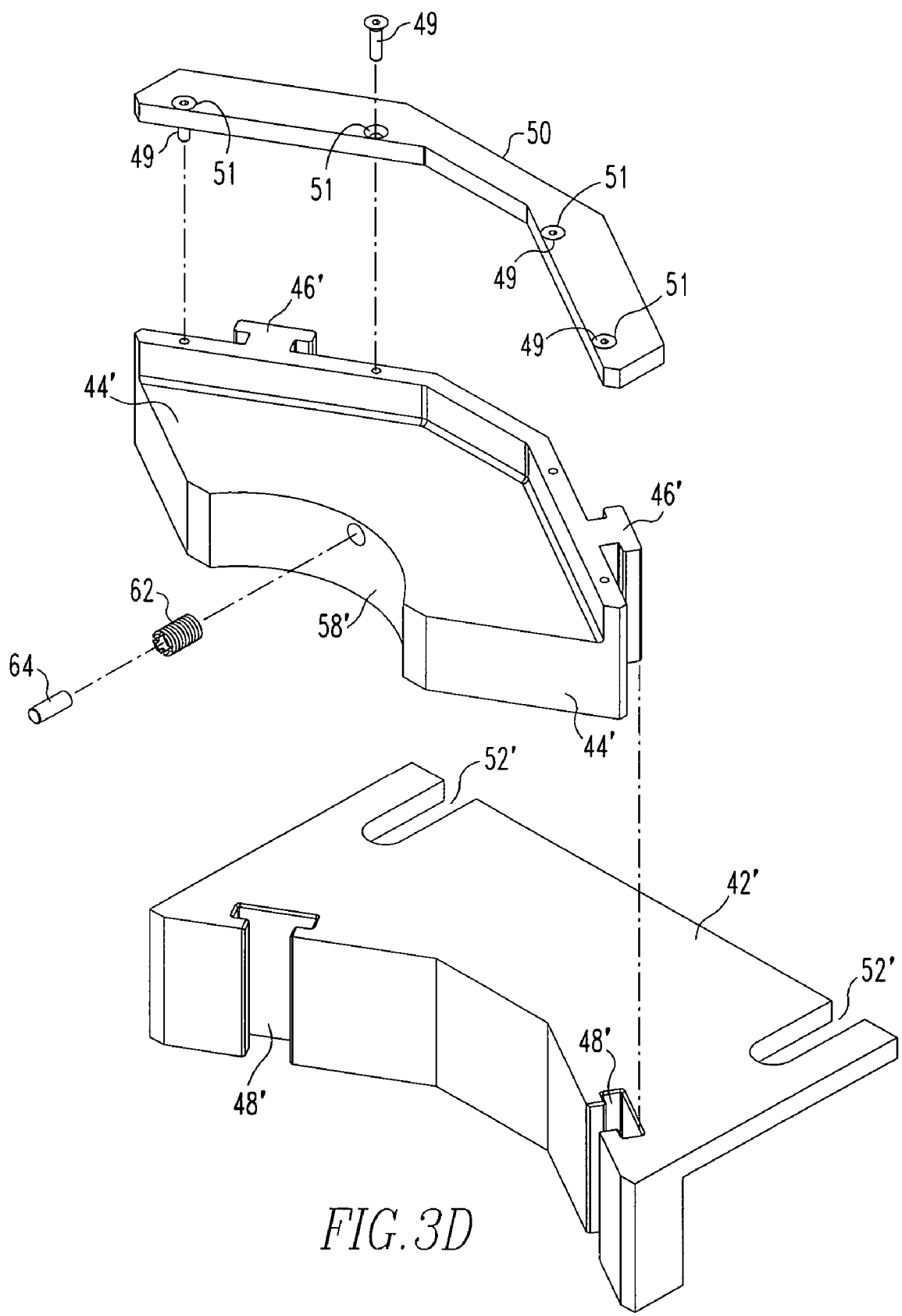
FIG. 3D is an exploded isometric view of a universal jaw adapter, jaw interlock and interlock support for use with the clamping bar of FIG. 3B in accordance with another embodiment of the invention.

However, it will be appreciated that any suitable alternative mechanism for attaching the jaws could be employed. For example, without limitation, as shown in FIG. 3D, the universal jaw adapter 42' could include T-notches 48' for receiving T-tabs 46' on the interchangeable jaw interlock 44'. The jaw assembly 42', 44' could further include the interlock support 50' with its plurality of holes 51 (four holes 51 are shown in the interlock support 50' in FIG. 3D) for receiving the corresponding number of fasteners 49, but without the through holes 48 of FIG. 3C. As previously discussed, the interchangeable jaw interlock 44' includes a gripping face or valve-engaging face 58'.

Figure 7:
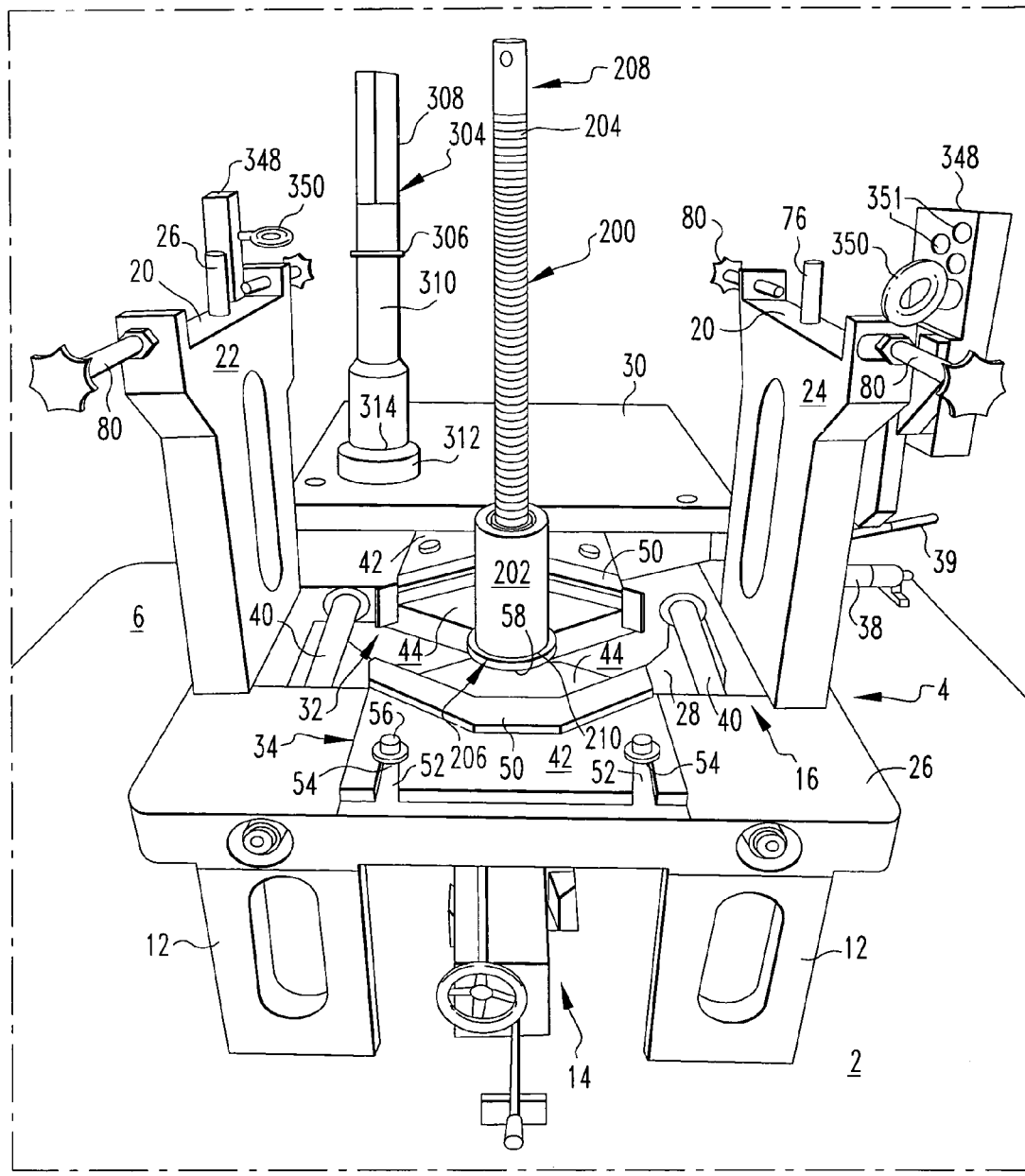
FIG. 7 is an isometric view of a governor valve assembly clamped within the workstation assembly of FIGS. 1 and 3 with the wrench assembly resting on the workstation deck plate and the stabilizing bar removed to permit insertion of the valve assembly.

Accordingly, the interchangeable jaw interlocks 44, 44' and valve-engaging faces 58, 58' thereof provide a fast method of preparing the workstation assembly 4 (FIGS. 1 and 3) for subsequent valve assemblies 200, 500 or subassemblies (not shown). Depending on the particular valve being worked on, for example, when the valve assembly 200 is a governor valve as shown in FIG. 7, the valve-engaging faces 58, 58' of the interchangeable jaw interlocks 44, 44' can accommodate threaded bushings 62 each having a pin hole 60 for receiving an alignment pin 64. The alignment pins 64 (one alignment pin 64 is shown in FIGS. 3C and 3D) are structured to align with and engage holes (not shown) in the valve plug 210 of the valve assembly 200 (FIG. 7).

FIGS. 4, 5 and 6A–6F are provided to further illustrate various components of the workstation assembly 4 and several representative tools 302 that are provided in the exemplary toolkit 300 (illustrated by way of the various tools shown in FIGS. 6A–6F, respectively).

FIG. 4 illustrates the base platform 6 of the workstation assembly 4 (FIGS. 1 and 3). Surface detail on the base platform 6 has been removed in FIG. 4 for ease of illustration. As discussed previously, the exemplary base platform 6 is adjustable by way of adjustable legs 8. An adjustable leg 8 is disposed at each corner of the base platform 6 and may be vertically adjusted, in order to level the base platform 6 and workstation assembly 4 (FIGS. 1 and 3) thereon. FIG. 4 further illustrates the slot 10 for receiving the shaft 94 of the adjustable pedestal 92 of the adjustable valve assembly 14 shown in FIG. 1A is shown and the spacer block 100, previously discussed. FIG. 5 further illustrates the upright members 12, which are coupled to and extend generally vertically from the base platform 6 (FIG. 4), in order to support the clamping frame 26. As shown, the exemplary assembly includes eight generally vertical upright members 12 supporting the clamping frame 26 in a generally horizontal orientation on top thereof. The exemplary clamping frame 26 is generally rectangular-shaped and includes an opening 28 for receiving the valve assembly 200 (see, for example, FIG. 7). As shown in FIG. 5, the left, short end of the clamping frame 26 includes a bracket 29 for mounting the pressure applicator 38, discussed hereinbefore. The opposite end includes the aforementioned generally stationary clamping bar 34. As previously discussed, two spaced apart upright positioning bars 22, 24 extend generally vertically from the top of the clamping frame 26. Each positioning bar 22, 24 includes the recess 20 for receiving the stabilizer bar 26 (FIGS. 1B and 2) of the stabilizing assembly 18 (FIGS. 1 and 1B).

Figure 6:
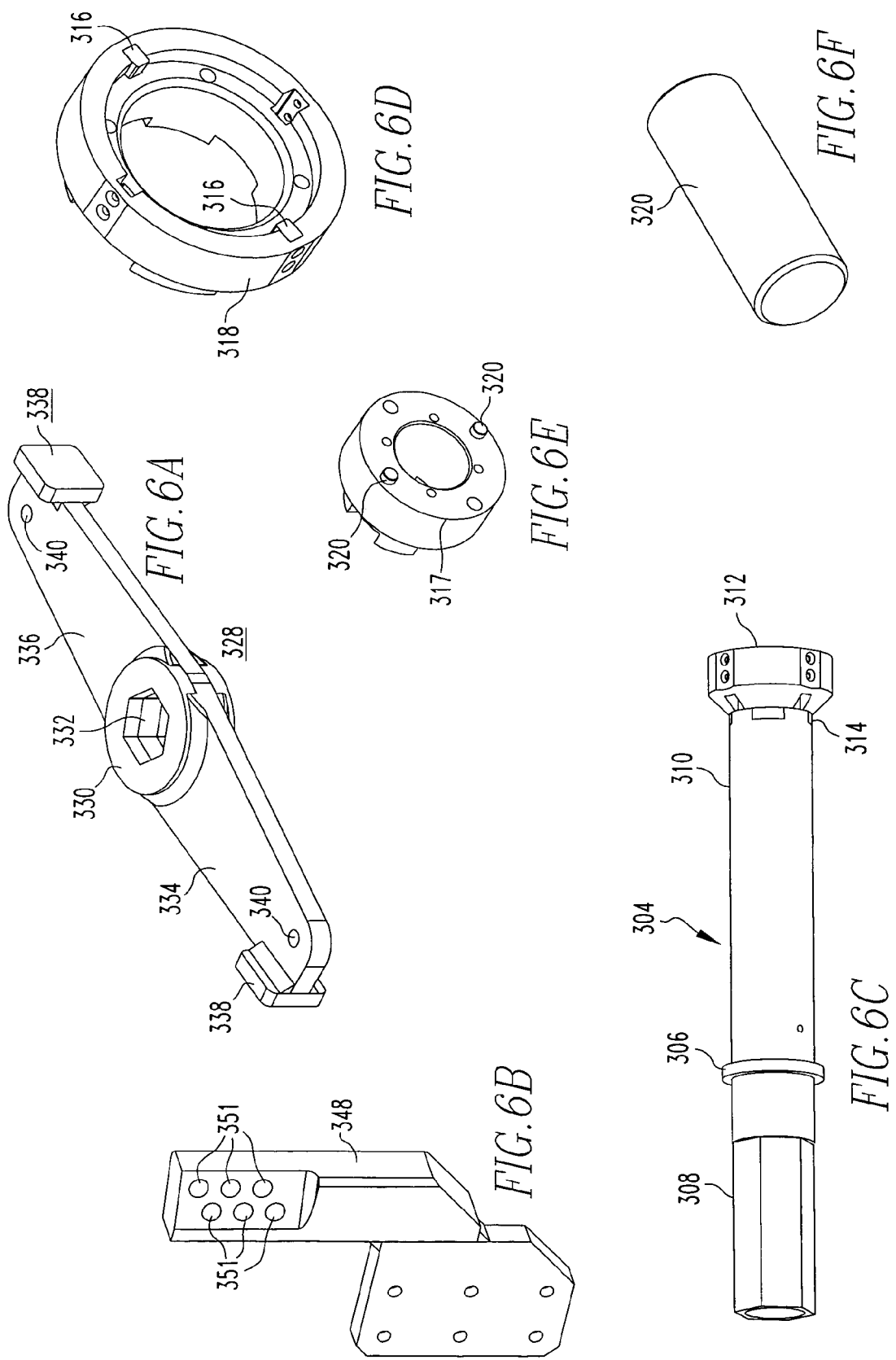
FIGS. 6A, 6B, 6C, 6D, 6E and 6F are isometric views of representative tools included in the exemplary toolkit of the valve assembly tooling system of the present invention, including a T-bar wrench, a come-along bracket, a wrench assembly, a key socket, a pin socket and an engagement pin, respectively.
Figure 9:
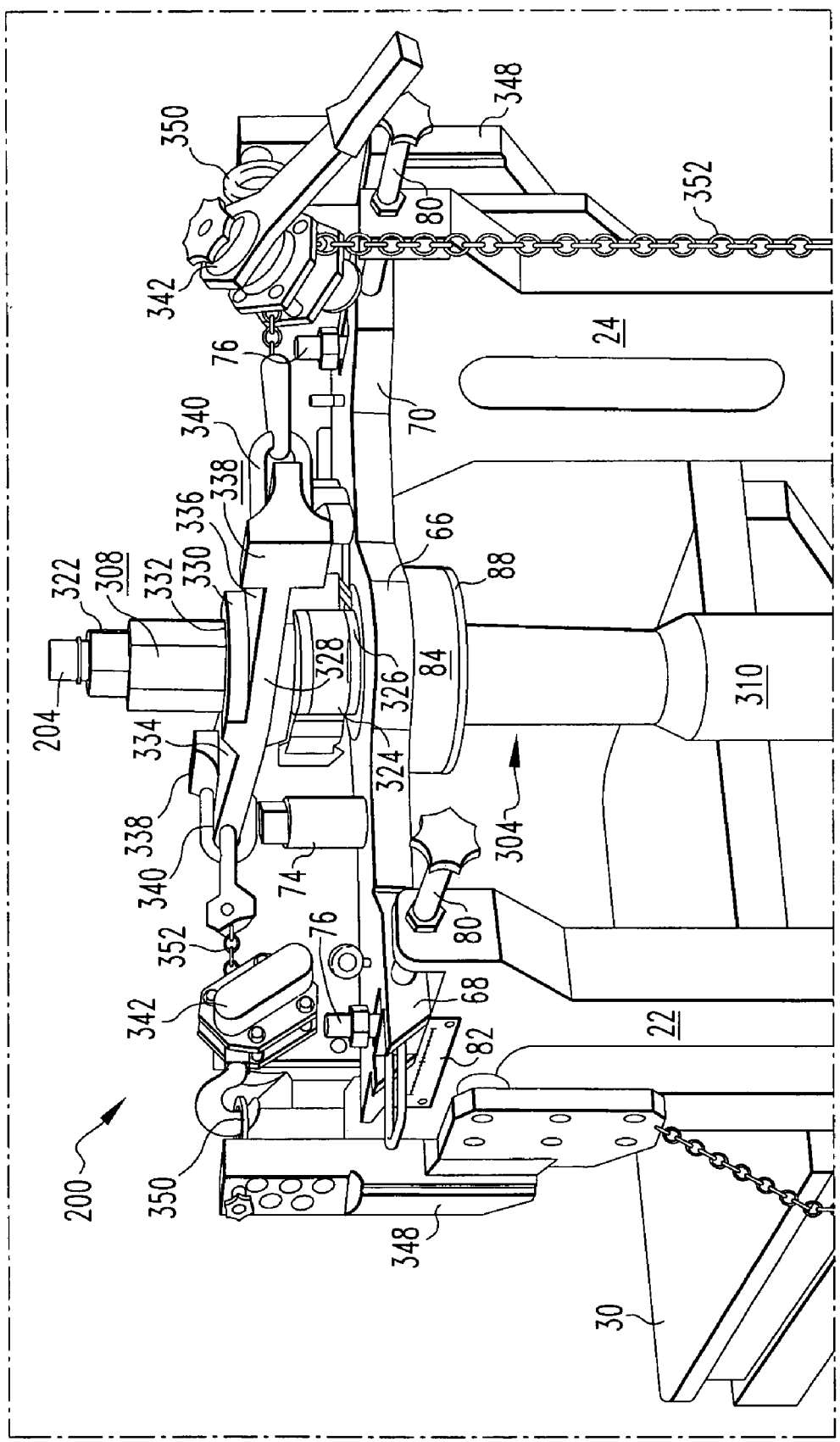
FIG. 9 is an isometric view of the assembly of FIG. 9 showing several tools as employed to disassemble the valve assembly in accordance with an embodiment of the invention.

FIGS. 6A–6F illustrate representative tools 302 (indicated generically in FIG. 9 as reference 302) which comprise the exemplary toolkit 300 (indicated generically as reference 300 in FIG. 9). FIG. 6A illustrates a T-bar wrench 328 which is used to apply torque to the valve nut 206. The exemplary T-bar wrench 328 includes a center portion 330 with an opening 332 extending therethrough. The exemplary opening 332 is hexagonally shaped corresponding to the hexagonally shaped end of the wrench assembly 304 (FIG. 6C). Arms 334, 336 extend outwardly from the center portion 330, as shown. A strike plate 338 is disposed at the outward ends of each arm 334, 336, respectively. The strike plates 338 provide a location for striking the T-bar wrench 328 with, for example, a sledgehammer (not shown), in order to apply a dynamic load to the T-bar 328 and the wrench assembly 304 to which it is attached. This dynamic load, as will be discussed hereinbelow, facilitates loosening or breaking loose the valve nut 206.

FIG. 6B shows a come-along bracket 348. As shown in FIG. 7, in the exemplary tooling system 2, a come-along bracket 348 is attached to each upright positioning bar 22, 24, respectively. An eyebolt 350 or safety hoist ring (not shown) is then inserted into one of the plurality of holes 351 in the upper portion of each come-along bracket 348, as shown. Accordingly, the come-along bracket 348 provides a convenient mounting location for the come-alongs 342 shown in FIG. 9, which are used to apply torque to the valve assembly 200.

FIG. 6C illustrates one example of a wrench assembly 304 which may be used in accordance with the present invention. The wrench assembly 304 includes an extension 310 at one end, which is structured to interlock with a spanner wrench 312 or key socket 317, 318 at an interface 314, as shown. At the opposite end of the wrench assembly is a reaction arm 308 with a hexagonally shaped portion structured to be engaged by, for example, a hydraulic wrench 324 (FIG. 8). As previously discussed, the wrench assembly 304 further includes a thrust collar 306, which is engaged by the exemplary Belleville washer assembly 84 (FIGS. 1B, 2 and 2A).

FIGS. 6D and 6E illustrate a key socket 318 and pin socket 317, respectively to be engaged by the extension 310 of the wrench assembly 304 at the interface 314, as shown in FIG. 6C. The key socket 318 (FIG. 6D) includes one or more keys 316 which are inserted into slots in the key 318 in order to secure the valve assembly 200 and effectively apply torque thereto, using the wrench assembly 304. Alternatively, as shown in FIG. 6E, the socket may be of the pin socket 317 variety. Pin sockets 317 employ pins 320 (best shown in FIG. 6F) to engage the valve nut 206 (not shown in FIGS. 6D and 6E) of the valve assembly 200, rather than the generally square-shaped keys 316 of the key socket 318 shown in FIG. 6D. The exemplary key sockets 318 contains four key slots with two keys 316 being used to engage with the valve nut 206 (not shown) during the exemplary valve disassembly operation. The remaining two key slots are oversized to accommodate a misshapen or damaged valve nut notch (not shown). Likewise, the pin sockets 317 have two regularly sized pin holes into oversized pin holes with a large diameter. However, it will be appreciated that any number of keys 316 or pins 320 may be employed to engage the valve nut (not shown). For example, additional holes (not shown) or slots (not shown) may be drilled in the valve nut to be engaged by the additional pins or keys. Moreover, a special jig (not shown) may be designed and employed to accurately drill such holes using a power drill (not shown). It will also be appreciated that the sockets are not limited to keys or pins as discussed herein, but could comprise any suitable alternative design (i.e., without limitation, a hexagonal socket (not shown) including a hexagonal insert (not shown)). The sockets can be designed to match the various contours of any type of valve to be worked on.

FIG. 7 illustrates the tooling system 2 and workstation assembly 4 as employed to engage and secure a governor valve assembly 200. As shown, the governor valve includes a valve body 202, a valve stem 204, a valve nut 206, an upper portion 208 and a valve plug 210. As shown, the stabilizer bar 66 (best shown in FIG. 2) has been removed and the valve assembly 200 has been inserted through the opening 28 in the clamping frame 26. The exemplary hydraulic jack 38 has been actuated by pumping the operating handle 39 in order to clamp the valve plug 210 between the moveable and generally stationary clamping bars 32, 34 of the clamping assembly 16. As shown, universal jaw adapters 42 and interchangeable jaw interlocks 44 are employed to engage and secure governor valves 200. Jaw adapters 42 and interlocks 44 are not used for all valve types. The wrench assembly 304 is shown resting on the deck plate 30 of the workstation assembly 4. As will be discussed hereinbelow, once the valve assembly 200 is aligned and secured within the workstation assembly 4, the wrench assembly 304 will be slid over the stem 204 of the valve assembly 200 until the spanner wrench socket 312 engages the valve nut 206.

FIG. 8 illustrates the governor valve assembly 200 of FIG. 7 after the wrench assembly 304 has been positioned and the stabilizer bar 66 has been replaced and fastened at each end 68, 70 to the corresponding positioning bar 22, 24 (one positioning bar 24 is shown in FIG. 8). As previously discussed, the exemplary Belleville washer assembly 84 on the stabilizer bar 66 provides a downward force to secure the wrench assembly 304 in place. As will be discussed herein below, a valve centering nut 322 is then tightened onto the valve stem 204 in order to center the valve stem 204 and secure the entire assembly in place. As shown, a wrench, such as the exemplary hydraulic wrench 324, may then be slid over the aforementioned corresponding hexagonal end 308 of the wrench assembly 304. The distal end of the hydraulic wrench 324 abuts one of the reaction posts 74 mounted to the stabilizer bar 66 in order to prevent undesired rotation of the hydraulic wrench 324 and thereby apply torque to the wrench assembly 304, efficiently.

As employed, torque is applied to the hexagonal end 308 of the wrench assembly 304, in order to torque the valve nut 206 to which it is connected and loosen and disassemble the valve assembly 200. As will be discussed in further detail hereinbelow, a combination of static force, developed by the exemplary hydraulic torque wrench 324, and dynamic impact force applied, for example, by striking the strike plates 338 (FIG. 9) of the T-bar wrench 328 with a sledgehammer (not shown), typically provides sufficient torsional force to loosen the valve nut 206. It will be appreciated that, depending on the particular valve being manipulated, that either the static force or the dynamic impact force, individually, may be sufficient to loosen the valve assembly 200. It will also be appreciated that various combinations of such forces may be required.

FIG. 9 illustrates the tools 302 of the exemplary toolkit 300 as employed to engage the wrench assembly 304 and apply torque thereto, in order to loosen the valve nut 206 (FIG. 7). As shown, the exemplary toolkit 300 includes a T-bar wrench 328, a hydraulic torque wrench 324, a spacer 326, a pair of come-alongs 342, a pair come-along brackets 348, a pair of eyebolts 350 or hoist rings (not shown) and two chains 352. The exemplary method of applying torque to the wrench assembly 304, which is described in detail hereinbelow, involves the general steps of sliding the hydraulic torque wrench 324 over the hexagonal end 308 of the extension wrench 310 and resting it upon the top surface of the stabilizing bar 66. As shown, the exemplary assembly further includes a spacer 326 disposed between the hydraulic wrench 324 and top surface of the stabilizer bar 66. Such a spacer may or may not be necessary depending on the type of valve being worked on and the combination of tools 302 used. As previously discussed, the end of the hydraulic wrench 324 is positioned against the upright reaction post 74 of the stabilizing bar 66. The hexagonal-shaped opening 332 of the T-bar wrench 328 is then placed over the corresponding hexagonal portion 308 of the wrench assembly 304. The T-bar 328 rests on top of the hydraulic torque wrench 324. In a preferred embodiment of the invention, the T-bar wrench is then coupled to the exemplary come-along brackets 348 by two come-alongs 342. As shown in FIG. 9, one end of each come-along 342 is coupled to an eyebolt 350 or hoist ring (not shown) fastened to the aforementioned come-along bracket 348 on the upright positioning bars 22, 24. The other end is attached to a chain attachment 340 on the arm 334, 336 of the T-bar 328. As will be discussed below, the come-alongs 342 are then employed to tighten the chains 352, thereby applying torque to the T-bar 328 and the wrench assembly 310 to which it is attached. The exemplary come-alongs are 0.75-ton capacity come-alongs 342. However, it will be appreciated that any known or suitable alternative device (not shown) having any acceptable loading capacity, could alternatively be employed to torque the exemplary T-bar 328. It will also be appreciated that, as previously discussed, and as will be discussed in further detail hereinbelow, that additional torque may be applied to the wrench assembly 304 by applying a dynamic load to the T-bar 328 (i.e., striking the strike plates 338 of the T-bar 328 with sledgehammers (not shown)).

FIG. 10 illustrates a throttle valve assembly 500 as engaged by the exemplary clamping assembly 16. Like the aforementioned governor valve assembly 200, the throttle valve assembly 500 is engaged to moveable and generally stationary clamping bars 32,34, respectively. The valve plug 510 is engaged just above the valves crush ring 512 by the valve-engaging faces 58 on the interchangeable jaw interlock 44. Accordingly, it will be appreciated that any number of valve assemblies or subassemblies may be engaged within the clamping assembly 16 of the tooling system 2 and workstation assembly 4 of the present invention, in order to quickly, accurately and safely perform an operation thereon.

Figure 11:
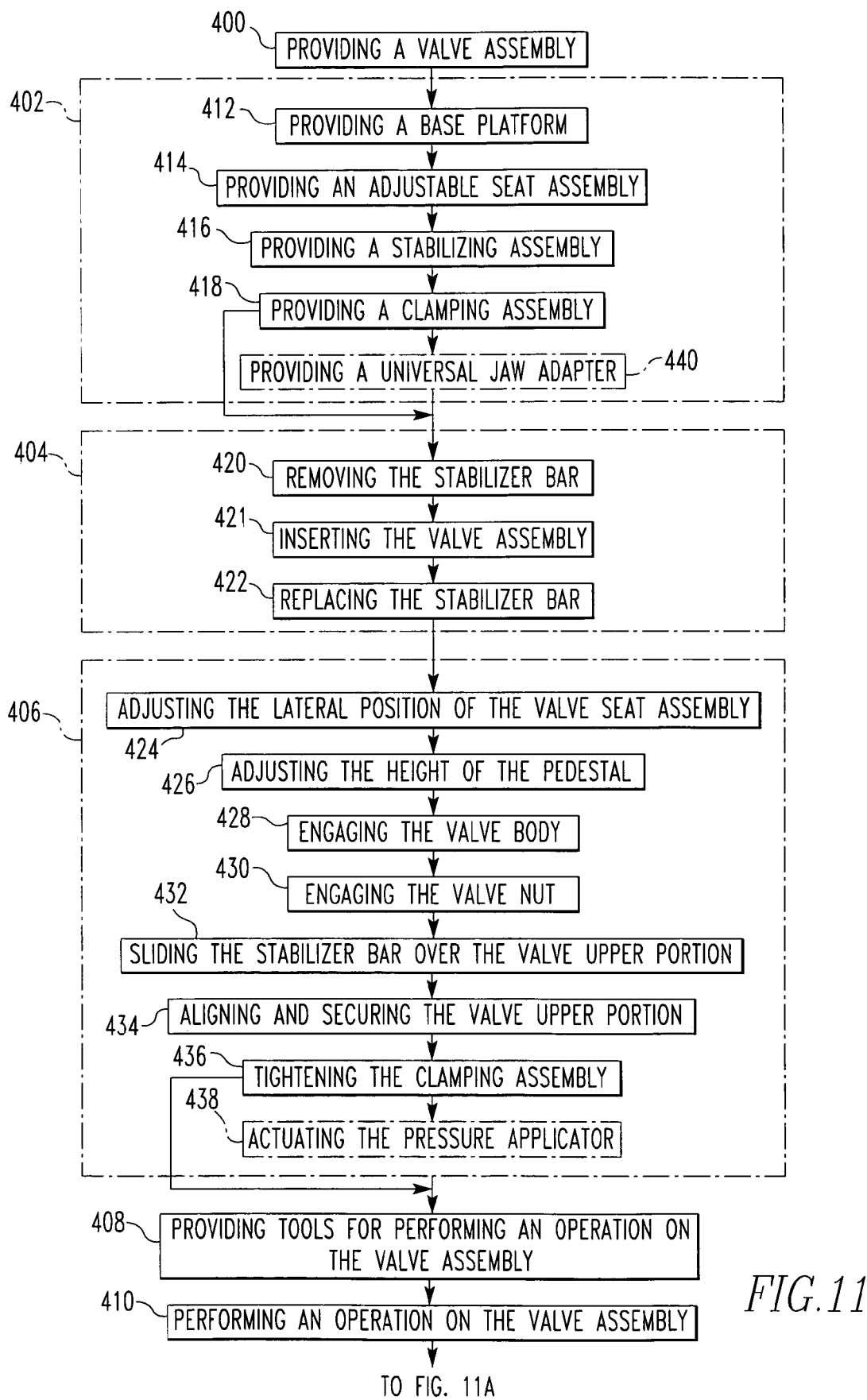
FIG. 11 is a flow diagram showing a method of disassembling a valve assembly using the valve tooling system and workstation assembly in accordance with an embodiment of the invention.

Referring now to FIG. 11, the method of the present invention includes step 400 providing a valve assembly 200, step 402 providing a tooling system 2 and workstation assembly 4, step 404 inserting the valve assembly 200 into the workstation assembly 4, step 406 aligning and securing the valve assembly 202, step 408 providing tools 302 for performing an operation on the valve assembly 200, and step 410 performing the operation on the valve assembly 200.

In the exemplary method, step 402 of providing a tooling system 2 and workstation assembly 4, further includes a step 412 of providing a base platform 6, a step 414 of providing an adjustable valve seat assembly 14, a step 416 of providing a stabilizing assembly 18 and a step 418 of providing a clamping assembly 16. As previously discussed, step 418 of providing a clamping assembly 16, depending on the type of valve being operated upon, may further include a step 440 of providing the universal jaw adapters 42 and interchangeable jaw interlocks 44.

As will be discussed in further detail by way of the illustrative examples hereinbelow, step 404 of inserting the valve assembly 200 into the workstation assembly 4 preferably includes the additional following steps: step 420, removing the stabilizer bar 66; step 421, inserting the valve assembly 200; and step 422, replacing the stabilizer bar 66.

Exemplary step 406, of aligning and securing the valve assembly 200, includes a step 424 of adjusting the lateral position of the adjustable valve seat assembly 14, a step 426 of adjusting the height of the adjustable pedestal 92, a step 428 of engaging the valve body 202 with the clamping bars 32, 34 of the clamping assembly 16, a step 430 of engaging the valve nut 206 with the exemplary wrench assembly 304, a step 432 of sliding the stabilizer bar 66 over the valve upper portion 208, a step 434 of aligning and securing the valve upper portion 208, and a step 436 of tightening the clamping assembly 16 in order to secure the aligned valve assembly 200 in the desired position. As shown in FIG. 11, step 436 of tightening the clamping assembly 16 may be accomplished by an additional step 438 of actuating the pressure applicator 3 8. As previously discussed, the exemplary pressure actuator is a hydraulic jack 38 which is actuated by pumping an operating handle 39. Step 438 of actuating the hydraulic jack 38, moves the clamping bars 32, 34 together to engage and secure the valve assembly 200 therebetween.

Figure 11A:
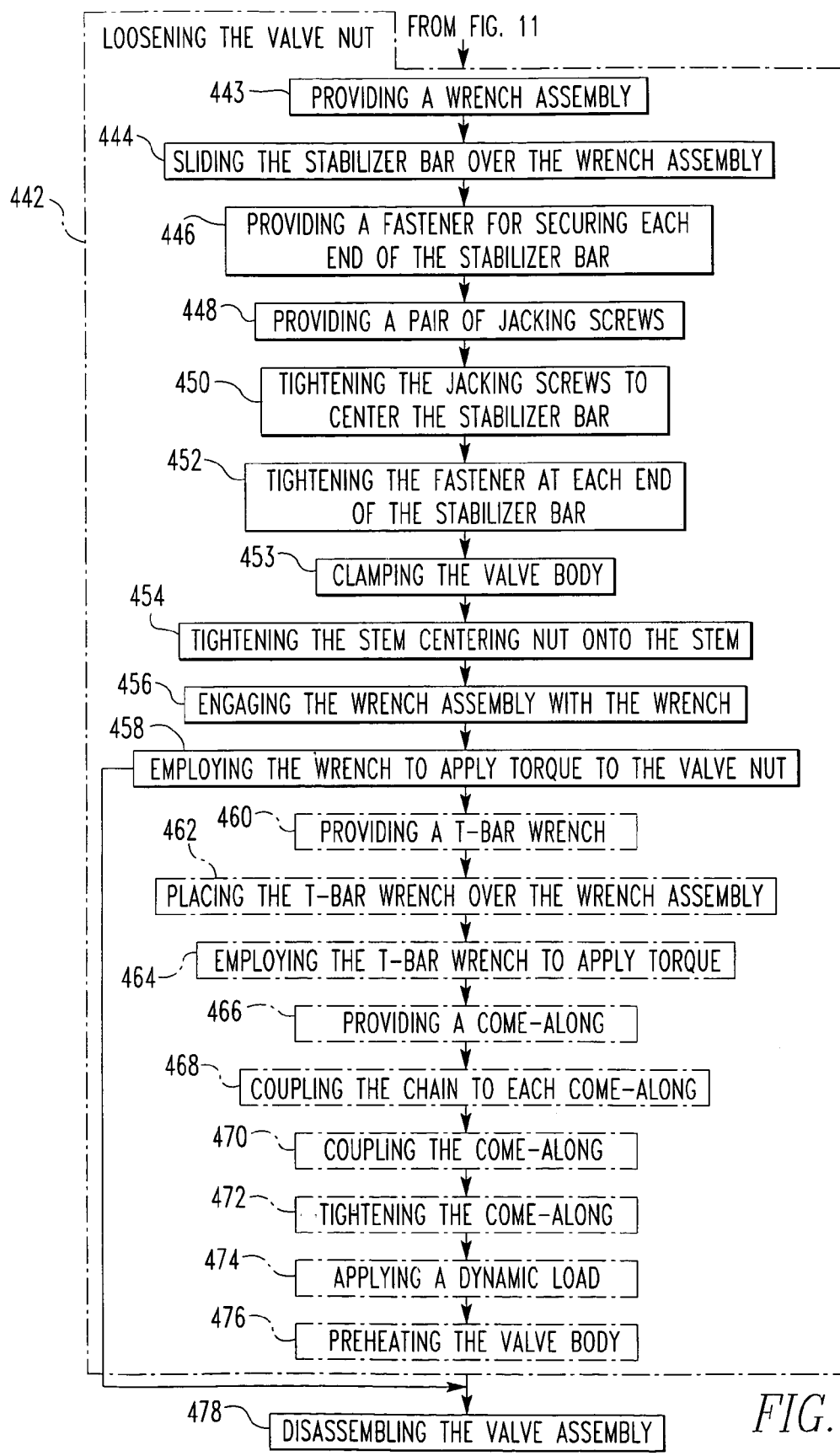
FIG. 11A is a flow diagram showing additional and optional steps of the method of FIG. 11 for disassembling a valve assembly in accordance with the method of the present invention.

As previously discussed, step 410 of performing an operation on the valve assembly 200, in the exemplary method, includes a step 442 of loosening the valve nut 206 in order to disassemble the valve assembly 200. FIG. 11A illustrates several representative steps which may be employed to apply torque to the valve assembly 200 in order to loosen the valve nut 206. For example, exemplary step 442 of loosening the valve nut 206, preferably includes the following additional steps: step 443, providing a wrench assembly 304; step 444, sliding the stabilizer bar 66 over the wrench assembly 304; step 446, providing a fastener 76 for securing each end 68, 70 of the stabilizer bar 66; step 448, providing a pair of jacking screws 80 for aligning each end 68, 70 of the stabilizer bar 66; step 450, tightening the jacking screws 80 to center the stabilizing bar 66; step 452, tightening the fastener 76 at each end 68, 70 of the stabilizer bar 66; step 453, clamping the valve body 200 within the clamping assembly 16; step 454, tightening the stem centering nut 322 onto the valve stem 204; and step 458, employing the wrench 324 to apply torque to the valve nut 206. As previously discussed, depending on the type of valve assembly 200 and the stubbornness of the valve nut 206, the foregoing steps may be sufficient to loosen the valve nut 202 and perform the final step 478, of disassembling the valve assembly 200.

However, frequently, valve assembly valve nuts 206 require additional torque in order to break them loose. It will, therefore, be appreciated that the following is a non-limiting list of several additional optional steps, representative of some of the additional methods of applying additional torque to loosen the valve nut 206. The sequence and exact application of such steps may of course be varied in order to affectively loosen the valve nut 202 and disassemble the valve assembly 200. The exemplary method of applying additional torque includes a step 460 of providing a T-bar wrench 328, a step 462 of placing the T-bar wrench 328 over the wrench assembly 304, and a step 464 of employing the T-bar wrench 328 to apply additional torque. It will be appreciated that the T-bar wrench 328 can be employed to apply such torque using a variety of methods. For example, such steps may include an additional step 466 of providing a come-along 342, a step 468 of coupling a chain 352 to each come-along 342, a step 470 of coupling the come-along 342 between the corresponding positioning bar 22, 24 and the T-bar wrench 328, and a step 472 of tightening each come-along 342.

It will also be appreciated that varying degrees of torque may be applied to the T-bar wrench 328 by tightening the come-alongs 342. For instance, as previously discussed, the appropriate amount of torque may be found, for example, in the field operation manual (not shown). In the exemplary method, the come-alongs 342 are tightened just sufficiently enough to remove any slack from the chains 352. Then, in an exemplary step 474, a dynamic load is applied to the T-bar wrench 328. As previously discussed, in the exemplary method, this involves striking the strike plates 338 on the T-bar wrench 328 with sledgehammers (not shown). This will typically be sufficient to break the valve nut 206 loose. However, it will be appreciated that varying degrees of torque applied using a variety of techniques, individually or in combination, using such dynamic load and the aforementioned static load (applied by the exemplary hydraulic torque wrench 324), may be employed in order to loosen the valve nut 206. If the valve nut still will not loosen, an additional step 476 of pre-heating the valve body 202 may be employed. It will be appreciated that the valve assembly may be preheated using any known or suitable heating mechanism (not shown), such as, for example, a conductive heat element (not shown) or oxy-propane torches (not shown). The aforementioned steps of applying torque to the valve nut 206 will result in quickly and safely loosening the valve nut 206 while resisting damage thereto. In this manner, final step 478, of disassembling the valve assembly 200, may be performed quickly and accurately, as compared to the prior art.

In order to provide additional clarification, several representative examples of valve disassembly in accordance with the method and apparatus of the present invention, will now be discussed. The following examples are not limiting in any way.

EXAMPLE 1

Throttle Valves, Throttle Valve Pilots and Governor Valves

If disassembling a throttle valve (FIG. 10), a throttle valve pilot or a governor valve (FIG. 7), universal jaw adapters 42 are used on the clamping bars 32, 34 of the clamping assembly 16. The universal jaw adapters 42 are not used for certain types of valves, such as intercept valves (not shown). The next step is to select two interchangeable jaw interlocks 44 to match the valve which is undergoing work. It will be appreciated that detailed instructions on all parts and clamping pressures used for specific valve types can be developed through engineering testing and experimentation and recorded in, for example, the aforementioned field procedure manual (not shown) for future reference when disassembling a particular valve type. The male T-tabs 46 on the exemplary jaw interlocks 44 fit securely into the female T-notches 48 in the exemplary universal jaw adapters 42. As previously discussed, the jaw interlocks 44 for governor and pilot valves may further employ bushings 62 and alignment pins 64 (best shown in FIG. 3C) for engaging corresponding holes (not shown) in the valve plug 210. However, it will be appreciated that the exemplary bushing 62 and alignment pins 64 are not necessarily required, depending on the particular valve being worked on.

Specifically, the exemplary jaw interlocks,44 for governor and pilot valves include two threaded bushings 62 on the exposed valve-engaging faces 58 of the jaw interlocks 44. These bushings 62 should rest flush with the curved valve engaging faces 58 of the interlocks 44. Once the bushings 62 are in place, the alignment pins 64 should be inserted into the bushings 62 to further secure the assembly. When the valve is seated on the adjustable valve seat assembly 14, the alignment pins 64 help align and hold the valve plug 210 firmly in place.

After the jaw interlock 44 is set, the next step is to adjust the jacking support assembly 90 until the adjustable pedestal 92 is at the appropriate working height. In the next step, the stabilizing bar 66 is removed by removing the two exemplary flange nuts 76 and loosening the four exemplary jack screws 80. The next step is to insert the valve assembly 200 so that it rests upon the pedestal 92 of the jacking support assembly 90. The pedestal 92 is then adjusted until the engagement pins 64 are aligned with the two holes (not shown) in the valve 200. Next, the jaws 44 are slid against the valve plug 210, but no hydraulic pressure is applied.

The wrench assembly 304 is then slid over the stem 204 of the valve assembly 200 until the keys 316 or pins 320 of the corresponding key or pin socket 318, 317 fully engage with the valve nut 206. Then, the stabilizing bar 66 is slid over the wrench assembly 304. The thrust collar 306 on the wrench 304 should engage with the exemplary Belleville washer assembly 84 located on the stabilizing bar 66. As a result of such engagement, the stabilizing bar 66 will rest slightly above the recess 20 in each of the positioning bars 22, 24. In the exemplary method, the stabilizing bar 66 rests about one-quarter inch above the recess 20. The exact spacing between the stabilizing bar 66 and positioning bar recesses 20 is not meant to be a limiting aspect of the invention. However, if the thrust collar 306 is not fully engaged, spacers 326 may be used to obtain the sufficient aforementioned downward force on the wrench assembly 304. When the stabilizing bar 66 is in position, the exemplary flange nuts 76 are replaced and tightened simultaneously, in order to compress the exemplary Belleville washer assembly 84 and to lock the stabilizing bar 66 in place. Once the flange nuts 76 are securely tightened, the jacking screws 80 are tightened. When tightening the jacking screws 80, vertical alignment is verified by, for example, using a ruler on each side of the positioning bars 22, 24 to measure and center the valve with respect to the positioning bar 22, 24. Alternatively, as in the exemplary embodiment, a graduated scale 82 could be added to the outer faces of the positioning bars 22, 24 to facilitate centering of the stabilizing bar 66. When installed properly, the stabilizing bar 66 provides rigid vertical alignment of the valve assembly 200.

The next step is to clamp the jaw interlocks 44 around the valve plug 210. In the exemplary method, this is accomplished using the aforementioned exemplary 30-ton hydraulic jack 38, with the handle pump 39 on the jack 38 being used to control the application of pressure. However, it will be appreciated by those of skill in the art that any alternative known or suitable method (e.g., without limitation, computer control) (not shown) or apparatus (e.g., without limitation, computer controlled actuators) (not shown) could be employed to tighten the jaw interlocks 44 around the valve plug 210. In this manner, the valve is safely secured in a stable position from which any number of operations may be consistently and predictably performed.

Once the valve is secured, the next step is to screw the stem centering nut 322 and the spacer, if required, onto the valve stem 204. On some valves, the outer diameter of the stem centering nut 322 will slide into the inner diameter of the wrench assembly 304 as the nut 322 is tightened onto the stem 204, without the need to add a spacer. However, if the nut 322 does not slide into the wrench assembly 304, a spacer should be added. When properly tightened, the stem centering nut 322 will hold valve components inside the wrench assembly firmly in vertical alignment.

Next, the exemplary hydraulic wrench 324 is placed over the protruding hexagonal end 308 of the wrench assembly 304. The wrench body will contact the stabilizing bar 66 with the reaction arm of the wrench 324 positioned against the vertical reaction post 74. If the reaction arm of the wrench 324 does not rest fully against the vertical reaction post 74, another spacer 326 may be added. The T-bar wrench 328 is then placed over the end of the wrench assembly 308 so that it rests on the top of the hydraulic wrench 324. The come-alongs 342 are then attached to the T-bar 328. As previously discussed, the exemplary method employs two come-alongs 342. One end of each chain 352 is attached to the chain attachment 340 on the arm 334, 336 T-bar and the other end is attached to the eyebolt 350 or hoist ring (not shown) on the come-along bracket 348 located on the side of the positioning bar 22, 24. The second come-along 342 is attached in the same manner on the opposite arm 334,336 of the T-bar 328. Both come-alongs 342 are tightened simultaneously until slight tension is achieved in the chains 352.

In the next step, a pressure appropriate for the particular valve being worked upon is preset for the hydraulic wrench 324. As previously discussed, appropriate valve-specific preset pressures may be developed, for example, through engineering testing and experimentation and then gathered, for example, in the field procedure manual (not shown) for future reference. Using the appropriate preset pressure, the hydraulic wrench 324 is employed to apply a constant, predetermined torque to the valve. As previously discussed, for some valves, for example, when disassembling certain pilot valves, this may be enough to loosen the valve nut 206.

However, frequently, when disassembling, for example, a governor valve, a dynamic impact force is also required. The impact force shears the four valve pins (not shown) and jars the valve nut 206 loose. As previously discussed, this impact force may comprise a dynamic force applied to the T-bar 328. For example, in the exemplary method, while the constant static torque force is being applied by the hydraulic wrench 324, two operators can simultaneously hit opposing sides of the T-bar 328. The exemplary T-bar 328 has striking plates 338 on each end, for this purpose. This concurrent striking of the T-bar 328 is continued until the valve nut 206 breaks loose. As soon as the valve nut 206 breaks loose, the flange nuts 76 and jacking screws 80 that hold the stabilizer bar 66 are loosened to permit the assembly to lift up as the valve nut 206 is unscrewed. The governor valve assembly 200 may then be disassembled.

When disassembling throttle valves 500, the jaw interlock 44 is closed so that it grips the valve body 502 just above the crush ring 512. It is very important never to grip or apply pressure to the crush ring 512, as this would severely damage the valve.

In the next step, the wrench assembly 304 slides over the valve until the pins 320 fully seat into the valve nut 206. It may be necessary to lightly tap the top of the wrench to seat the pins 320. The stabilizer bar 66 is then slipped over the wrench assembly 304, so that the exemplary Belleville washer assembly 84 fully engages the thrust collar 30. As discussed above, spacers 326 may be used if necessary to achieve a snug fit. As with the governor and pilot valves, for example, the flange nuts 76 are then tightened simultaneously and the jacking screws 80 retightened, making sure that both ends 68, 70 of the stabilizer bar 66 are centered between the positioning bars 22, 24.

Next, the jaw interlocks 44 are clamped tightly in place by applying pressure with the exemplary hand pump 39 of the hydraulic jack 38. The exemplary method includes a next step of tightening brass-tipped set screws (not shown) that are inserted through the wrench body 304 in order to prevent the valve stem (not shown) from turning as the stem centering nut 322 is tightened. However, it will be appreciated that any suitable method of engaging the valve stem (not shown) could be employed (e.g., without limitation to insert a tool (not shown) through the throttle valve body 502). Next, the stem centering nut 322 is tightened onto the valve stem (not shown) and the hydraulic wrench 324 is positioned over the wrench assembly 304. The T-bar 328 is then positioned on the wrench assembly 304 and the come-alongs 342 are fixed between the T-bar 328 and the come-along brackets 348 on each positioning bar 22, 24. The come-alongs 342 are tightened only until slack is removed from the chains 352 and a minimal amount of torque is applied.

In the next step, heat is applied to the valve body 502. In the exemplary method of disassembly, this step includes the use of a heating coil (not shown). However, any suitable alternative method of pre-heating could be employed. For example, two oxy-propane torches (not shown) could be used to heat the valve body for a period of about one to three minutes. It is important to monitor the valve temperature using, for example, a heat probe (not shown) or infrared sensor (not shown). To prevent damage to internal valve components, it is desirable to not allow temperatures to rise above about 600° F. (316° C.), and to assure uniform heating. Once the valve is at the correct temperature (similar to the determination of the appropriate valve-specific preset hydraulic wrench pressure, previously discussed, the appropriate heated temperature for a particular valve type may be established through engineering testing and experimentation and then recorded in, for example, the field procedure manual for future reference) the next step is to tighten the come-alongs 342 simultaneously. This may be sufficient to loosen the valve nut (not shown).

However, as discussed hereinbefore, if the valve nut does not loosen, the exemplary step of striking the strike plates 338 of the T-bar 328 using two sledgehammers (not shown) at the same time, may be employed. If this dynamic, impact load does not work, an additional step of applying torque by way of the hydraulic wrench 324 while simultaneously striking the T-bar 328, may be employed. As with the aforementioned governor valves, once the valve nut is loosened, the flange nuts 76 and jacking screws 80 on the ends 68, 70 of the stabilizing bar 66 should be loosened to allow the valve nut to be removed and to complete the disassembly of the valve.

The next example discusses disassembly of interceptor valves (not shown). The example is not limiting in any way.

EXAMPLE 2

Interceptor Valves

Disassembly of interceptor valves (not shown) using the method and tooling system 2 of the present invention is accomplished in much the same manner as the aforementioned method of disassembling throttle valves (FIG. 10), throttle valve pilots and governor valves (FIG. 7).

First, the lock nuts of the interceptor valve should first be soaked in penetrating oil for an extended period of time. Unlike the foregoing example, the universal jaw adapters 42 are not used for clamping interceptor valves. Instead, the jaw adapters 42 are removed and the pre-existing solid clamping plates 36, which are already present, are used to grip the valve body 202. The exemplary clamping plates 36 are made from brass. However, it will be appreciated that any alternative known or suitable material could be employed.

When working with interceptor valves, after attaching the wrench assembly 304, the next step is to lock the stabilizing bar 66 down, in accordance with the aforementioned method. Next, the jacking support assembly 90 is used to raise or lower the valve body until, as previously discussed, the thrust collar 306 of the wrench assembly 304 properly engages with the Belleville washer assembly 84. Once the proper downward force is obtained to hold the wrench assembly 304 in place, the clamping plates 36 are tightly clamped around the valve body.

The remainder of the process is substantially similar to the aforementioned method of disassembly. It will be appreciated that any combination of the aforementioned techniques for applying torque and loosening the valve nut, may be employed.

Accordingly, the foregoing examples demonstrate how the aforementioned apparatus and process, when compared with the prior art, provide a greatly improved, fast, safe, predictable and non-destructive method of disassembling valve assemblies such as those used in steam power generation stations.

Accordingly, the valve tooling system 2 and method of use thereof of the present invention provides a fast, safe and consistent method of, for example, disassembling any number of valve types, by providing a number of effective mechanisms for individually or in combination, applying concentrated strength to unseat even the most reluctant valve nuts. The exemplary base platform 6 and valve aligning and securing mechanisms 14, 16, 18 of the workstation assembly 4 eliminate the unpredictability of known conventional manual procedures. Additionally, the use of hydraulic and manual tooling, employed to apply a uniform and predictable torque, is a vast improvement over known prior methods employing a variety of experimentally derived kluges. The predictability and efficiency of the valve tooling system 2 and method of the present invention greatly reduces the likelihood of damage caused to the valve and shortens the duration of power generation station downtime or outage period required to work on a valve assembly.

It will be appreciated by those of ordinary skill in the art that the structures and methods of the invention discussed herein are only intended to be illustrative of the broad concept of the invention. For example, without limitation, it will be appreciated that the workstation assembly 4 may be structured as a substantially unitary welded structure wherein the valve assemblies to worked on are transported to the workstation, or alternatively, it could be structured as an assembly of components that are readily disassembled and reassembled in order to quickly and easily transport the entire tooling system 2 to the desired location (i.e., to a power generation station having one or more valve assemblies which need to be worked on).

It will also be appreciated that any number of suitable alternative components and method steps could be alternatively employed to safely and quickly secure a valve assembly and perform an operation thereon. It will further be appreciated that the methods of disassembly discussed herein were meant only to provide illustrative examples of the invention and in no way limit the invention. A variety of different modified embodiments and methods could alternatively be employed to not only disassemble a valve assembly, but also to perform any number of other procedures, such as, for example, valve initial assembly, maintenance, inspection and repair. It will still further be appreciated that the invention is not limited to the types of valves discussed herein.

Moreover, the Figures provided herein are only intended to illustrate the principle behind the described embodiments of the invention. For example, it will be appreciated that a variety of different tools, other than those discussed herein, could be employed with the method of the present invention and some of those tools could be automated by computer control. Moreover, any variety of methods for applying both static and dynamic loads other than, or in addition to, the exemplary methods and tools discussed herein could be used to apply force to, for example, the valve nut.

Therefore, while specific embodiments of the invention have been described in detail, it will be appreciated by those skilled in the art that various modifications and alternatives to those details could be developed in light of the overall teachings of the disclosure. Accordingly, the particular arrangements disclosed are meant to be illustrative only and not limiting as to the scope of the invention which is to be given the full breadth of the claims appended and any and all equivalents thereof.

What is claimed is:

1. A tooling system for a valve assembly including a valve body and internal workings, comprising:
    a workstation assembly including a plurality of clamping and alignment mechanisms structured to engage said valve body of said valve assembly at a plurality of locations to align and secure said valve assembly in order to perform an operation thereon in which said internal workings of said valve assembly are exposed; and
    a toolkit including a plurality of tools for performing said operation on said valve assembly, which is aligned and secured in said workstation assembly,
    wherein said workstation assembly provides a number of mounting locations for receiving at least some of said tools in order to facilitate the use of said tools to perform said operation on said valve assembly,
    wherein said workstation assembly further comprises:
        a generally horizontal base platform;
        a plurality of upright members coupled to and extending generally vertically from said base platform;
        an adjustable valve seat assembly coupled to said base platform and structured to adjust the height and alignment of said valve assembly being worked on;
        a stabilizing assembly structured to further align and secure said valve assembly; and
        a clamping assembly structured to engage and secure said valve assembly once it is aligned in order to permit said operation to be quickly and easily performed on said aligned, secured valve assembly,
    wherein said plurality of upright members includes a number of substantially rigid upright members and a pair of upright positioning bars; wherein said clamping assembly includes a generally horizontal clamping frame forming an opening for receiving said valve assembly therethrough; wherein said generally horizontal clamping frame is coupled on top of said number of upright members extending generally vertically from said base platform; and wherein said pair of upright positioning bars extend generally vertically above said generally horizontal clamping frame in order to receive said stabilizing assembly.

2. The tooling system of claim 1 wherein said plurality of tools in said toolkit are selected from the group consisting of wrench assemblies, wrenches, T-bar wrenches, come-alongs, come-along brackets, eyebolts, chains, keys, pins, pin sockets and key sockets.

3. The tooling system of claim 2 wherein said valve assembly includes a valve stem and a valve nut; wherein said valve nut is tightened onto said valve stem in order to assemble said valve assembly and said valve nut is loosened on said valve stem in order to disassemble said valve assembly; wherein said operation performed on said valve assembly is to disassemble said valve assembly by loosening said valve nut; and wherein said plurality of tools facilitate the loosening of said valve nut, in order to permit disassembly of said valve assembly while resisting damage thereto.

4. A tooling system for a valve assembly, comprising:
    a workstation assembly structured to align and secure said valve assembly in order to perform an operation thereon; and
    a toolkit including a plurality of tools for performing said operation on said valve assembly, which is aligned and secured in said workstation assembly,
    wherein said workstation assembly further comprises:
        a generally horizontal base platform;
        a plurality of upright members coupled to and extending generally vertically from said base platform;
        an adjustable valve seat assembly coupled to said base platform and structured to adjust the height and alignment of said valve assembly being worked on;
        a stabilizing assembly structured to further align arid secure said valve assembly; and
        a clamping assembly structured to engage and secure said valve assembly once it is aligned in order to permit said operation to be quickly and easily performed on said aligned, secured valve assembly, wherein said plurality of upright members includes a number of substantially rigid upright members and a pair of upright positioning bars; wherein said clamping assembly includes a generally horizontal clamping frame forming an opening for receiving said valve assembly therethrough wherein said generally horizontal clamping frame is coupled on top of said number of upright members extending generally vertically from said base platform; and wherein said pair of upright positioning bars extend generally vertically above said generally horizontal clamping frame in order to receive said stabilizing assembly, and wherein said valve assembly includes a valve body; wherein said clamping assembly includes a movable clamping bar, a generally stationary clamping bar and a pressure applicator for moving said movable clamping bar towards said generally stationary damping bar, said movable clamping bar coupled to a guide rail on said clamping frame, said generally stationary clamping bar disposed at an end of said clamping frame opposite said movable clamping bar, and said pressure applicator coupled between said movable clamping bar and the opposite end of said clamping frame; and wherein said pressure applicator is structured to apply pressure to said movable clamping bar thereby moving it against said valve body, in order to securely clamp said valve body between said movable clamping bar and said generally stationary clamping bar.

5. The tooling system of claim 4 wherein at least one of said movable and generally stationary clamping bars includes a universal jaw adapter for receiving an interchangeable, valve-specific jaw interlock; and wherein said jaw interlock includes a valve-engaging face for securing said valve assembly while resisting damage thereto.

6. A tooling system for a valve assembly, comprising:
a workstation assembly structured to align and secure said valve assembly in order to perform an operation thereon; and
a toolkit including a plurality of tools for performing said operation on said valve assembly, which is aligned and secured in said workstation assembly,
wherein said workstation assembly further comprises:
a generally horizontal base platform;
a plurality of upright members coupled to and extending generally vertically from said base platform;
an adjustable valve seat assembly coupled to said base platform and structured to adjust the height and alignment of said valve assembly being worked on;
a stabilizing assembly structured to further align and secure said valve assembly; and
a clamping assembly structured to engage and secure said valve assembly once it is aligned in order to permit said operation to be quickly and easily performed on said aligned, secured valve assembly,
wherein said plurality of upright members includes a number of substantially rigid upright members and a pair of upright positioning bars; wherein said clamping assembly includes a generally horizontal clamping frame forming an opening for receiving said valve assembly therethrough; wherein said generally horizontal clamping frame is coupled on top of said number of upright members extending generally vertically from said base platform; and wherein said pair of upright positioning bars extend generally vertically above said generally horizontal clamping frame in order to receive said stabilizing assembly, and wherein said valve assembly includes a valve stem and a valve nut; and wherein said stabilizing assembly comprises:
a stabilizer bar including an aperture extending therethrough for receiving said valve stem of said valve assembly;
a fastener for each end of said stabilizer bar, said fastener structured to secure each end of said stabilizer bar to the top of a corresponding one of said upright positioning bars, respectively, when tightened; and
a centering mechanism for aligning said stabilizer bar and said valve assembly therein with respect to said upright positioning bars.

7. The tooling system of claim 6 wherein said stabilizer bar further includes a Belleville washer assembly surrounding the aperture through said stabilizer bar, said Belleville washer assembly structured to provide a downward force on a wrench assembly engaging said valve assembly, in order to compressively secure said wrench assembly for performing said operation on said valve assembly.

8. The tooling system of claim 6 wherein said centering mechanism includes a pair of jacking screws on each of said corresponding upright positioning bars for aligning the ends of said stabilizing bar with respect to said upright positioning bars, thereby aligning said valve assembly within said workstation assembly.

9. A tooling system for a valve assembly, comprising:
a workstation assembly structured to align and secure said valve assembly in order to perform an operation thereon; and
a toolkit including a plurality of tools for performing said operation on said valve assembly, which is aligned and secured in said workstation assembly,
wherein said workstation assembly further comprises:
a generally horizontal base platform;
a plurality of upright members coupled to and extending generally vertically from said base platform;
an adjustable valve seat assembly coupled to said base platform and structured to adjust the height and alignment of said valve assembly being worked on;
a stabilizing assembly structured to further align and secure said valve assembly; and
a clamping assembly structured to engage and secure said valve assembly once it is aligned in order to permit said operation to be quickly and easily performed on said aligned, secured valve assembly, and
wherein said base platform includes a slot extending through a portion thereof; and wherein said adjustable valve seat assembly comprises:
an adjustable pedestal structured to support said valve assembly while permitting vertical adjustment thereof; and
an adjustable jacking support assembly coupled to the slot in said base platform, in order to provide transverse adjustment of said adjustable pedestal, which is coupled thereto, thereby providing further alignment of said valve assembly within said opening in said clamping frame and with respect to said stabilizing assembly.

10. The tooling system of claim 9 wherein said adjustable jacking support assembly includes at least one jacking screw for providing said adjustment of said adjustable pedestal arid said valve assembly supported thereon.

* * * * *